(12) United States Patent
Yoshizumi et al.

(10) Patent No.: US 7,520,067 B2
(45) Date of Patent: Apr. 21, 2009

(54) THREE-DIMENSIONAL MEASUREMENT PROBE

(75) Inventors: Keiichi Yoshizumi, Osaka (JP); Keishi Kubo, Osaka (JP); Hiroyuki Mochizuki, Osaka (JP); Takanori Funabashi, Osaka (JP)

(73) Assignee: Panasonic Corporation, Osaka (JP)

( * ) Notice: Subject to any disclaimer, the term of this patent is extended or adjusted under 35 U.S.C. 154(b) by 10 days.

(21) Appl. No.: 11/979,034

(22) Filed: Oct. 30, 2007

(65) Prior Publication Data
US 2008/0148588 A1 Jun. 26, 2008

(30) Foreign Application Priority Data
Dec. 20, 2006 (JP) .............................. 2006-342703

(51) Int. Cl.
*G01B 5/012* (2006.01)
(52) U.S. Cl. .................. 33/561; 33/559; 33/DIG. 1; 33/DIG. 2
(58) Field of Classification Search .................. 33/503, 33/556, 557, 558, 559, 560, 561, DIG. 1, 33/DIG. 2
See application file for complete search history.

(56) References Cited
U.S. PATENT DOCUMENTS
5,212,873 A * 5/1993 McMurtry .................. 33/561
5,669,152 A * 9/1997 McMurtry .................. 33/558
2005/0204573 A1* 9/2005 Kassai et al. ................ 33/559
2008/0134486 A1* 6/2008 Enderle et al. .............. 33/559
2008/0295349 A1* 12/2008 Uhl et al. .................... 33/503

FOREIGN PATENT DOCUMENTS

| JP | 7-58161 | 6/1995 |
|---|---|---|
| JP | 3000819 | 1/2000 |
| JP | 3046635 | 5/2000 |
| JP | 2003-42742 | 2/2003 |
| JP | 2004-93192 | 3/2004 |
| JP | 2005-134332 | 5/2005 |
| JP | 2005-181233 | 7/2005 |
| JP | 2006-78367 | 3/2006 |

* cited by examiner

*Primary Examiner*—G. Bradley Bennett
(74) *Attorney, Agent, or Firm*—Wenderoth, Lind & Ponack, L.L.P.

(57) ABSTRACT

A three-dimensional measurement probe that is less likely to break, that is of long lifespan, and that is of low cost, capable of measuring the shape and the like of a measuring object such as an aspheric lens with higher precision is realized. A magnetic force for preventing rotation and axial displacement of a small slidably moving shaft part is generated by constructing a magnetic circuit by a magnet attached to a small air bearing part, a yoke, and a magnetic pin attached to the small slidably moving shaft part. The three-dimensional measurement probe is able to perform measurement from below and from the side since the magnetic force is non-contacting.

11 Claims, 16 Drawing Sheets

THREE-DIMENSIONAL MEASUREMENT PROBE

BACKGROUND OF THE INVENTION

The present invention relates to a three-dimensional measurement probe for measuring the shape etc. of a measuring object, mainly such as an aspheric lens, with ultrahigh precision of 0.01 micron order, the three-dimensional measurement probe being attached to an ultrahigh precision three-dimensional measuring apparatus having a measurement range in the XYZ direction (vertical, lateral, height) of 30 mm×30 mm×20 mm on the small size and 400 mm×400 mm×90 mm on the large size, and being capable of measuring the measuring object with low measuring force of 0.1 to 0.3 mN in a probe axial direction through continuous scanning almost without damaging the measuring object from a part having an angle of inclination of 0 degrees to a high inclination part of 75 degrees in any direction of the measuring surface.

Aspheric lenses must be manufactured with high precision of lower than or equal to 0.1 micron, and this precision cannot be achieved by simply performing mechanical processing. An ultrahigh precision three-dimensional measuring apparatus having a precision of 0.01 micron order and a three-dimensional measurement probe to be attached thereto were thus invented. The subject matters thereof are disclosed in a first patent document (Japanese Patent No. 3000819 (p. 3, FIG. 1)), a second patent document (Unexamined Japanese Patent Publication No. 2006-78367 (p. 16, FIG. 8)), and the like. An aspheric lens is measured by the measuring apparatus, and the result of measurement is fed back for the processing of the aspheric lens, so that a die for the aspheric lens is manufactured with a precision of less than or equal to 0.1 micron.

However, the required precision has become higher for aspheric lenses used in recent digital cameras and high-capacity optical discs and the like due to thinning, higher image quality, wider angle, and higher zoom magnification. Thus, a probe that realizes higher precision is desired. Such a three-dimensional measurement probe, which is less likely to break and is of longer lifespan, is desired as to be used easily and frequently by frontline workers in factory sites.

Conventional three-dimensional shape measurement probes for aspheric lenses will be briefly described with reference to the first patent document and the second patent document.

FIG. 10 shows the three-dimensional measurement probe disclosed in the first patent document. A small slidably moving shaft part 306 fixed to a stylus 305 that contacts a measuring object S is movable in the Z direction with respect to a small air bearing part 307, and is suspended from an interatomic force probe frame 303 by a plate spring 350.

A mirror 309 is attached to the small slidably moving shaft part 306, where a semiconductor laser beam from a semiconductor laser 334 is focused at and reflected by the mirror 309, and an optical probe displacement detecting part 302 and the interatomic force probe frame 303 are integrally driven by a coil 313 so that the displacement of the small slidably moving shaft part 306 with respect to the optical probe displacement detecting part 302 becomes constant. "Focus servo" herein refers to application of servo control such that the semiconductor laser beam from the semiconductor laser 334 is focused at the surface of the mirror 309.

Regarding the Z coordinate measurement at a measuring point, the measuring force will slightly fluctuate when an error occurs in the focus servo but will hardly cause a measurement error, since the displacement amount of the distance to the mirror 309 is measured by directly irradiating an oscillation frequency stabilizing laser beam Fz to the mirror 309 and interfering with the reflected light from the mirror 309.

FIG. 11 shows a measurement probe disclosed in the second patent document. Similarly to the first patent document, a small slidably moving part 316 in a cylindrical shape is supported by a plate spring 315 and attached with a mirror 319.

FIG. 5B shows a configuration of an ultrahigh precision three-dimensional measuring apparatus disclosed in a third patent document (Japanese Patent No. 3046635 (p. 6, FIG. 1)) that is suitable for mounting the probe of the first patent document or the second patent document. An upper stone platen 106 mounted with an oscillation frequency stabilizing laser 127 for measuring the XYZ coordinates, a length measuring part, a Z slider 111, and an optical probe displacement detecting part 112 moves in an XY direction by an X stage 121 and a Y stage 122. An X reference mirror 124 and a Y reference mirror 125 are fixed to a lower stone platen 123, and an upper Z reference mirror 126 fixed to a gate-shaped mount 107, which is fixed to the lower stone platen 123, is also arranged, where the coordinate axis precision of 10 nm order or the flatness of the reference mirrors 124, 125, 126 is achieved even if the movement straightness of the X stage 121 and the Y stage 122 is 1 micron order by measuring the change in distance to the high plane mirrors (X reference mirror 124, Y reference mirror 125, upper Z reference mirror 126) with the oscillation frequency stabilizing laser 127 on the axis of a measuring point of a measuring object 101.

The third patent document had been written before the three-dimensional measurement probes named interatomic force probes of the first patent document and the second patent document were invented, and only an optical probe 112 is attached.

FIGS. 12 and 13 show a contact type probe disclosed in a fourth patent document (Unexamined Japanese Patent Publication No. 2003-42742 (p. 19, FIGS. 1 and 2)). FIGS. 14A and 14B show a hydrostatic bearing device and a displacement measuring device disclosed in a fifth patent document (Japanese Patent Publication No. 07-58161 (p. 6, FIG. 1)).

(1) Issues to be solved by the present invention defined in independent claims are as follows.

An object of one aspect of the present invention is to realize a three-dimensional measurement probe that is less likely to break and that is of long life span and low cost for measuring the shape etc. of the measuring object such as an aspheric lens with higher precision.

The requirements for a probe for measuring with ultrahigh precision include small measuring force of 0.1 to 0.3 mN (10 to 30 mgf), and although contradicting, quick response of the probe with respect to such very weak measuring force, and no tilting of a stylus at the distal end of the probe with respect to lateral force are also required.

If the measuring force is large, the measurement precision lowers since the measuring surface is deformed. Furthermore, wear of the stylus that contacts the measuring surface becomes quicker. If the response of the probe is slow, the scanning speed must be lowered to follow up the measuring surface, which leads to longer measurement time, and data drift caused by temperature change and the like may occur during the measurement time, thereby degrading the measurement precision and lowering the efficiency. Lateral force acts on the distal end of the stylus if the measuring surface is inclined, and the lateral force becomes larger than in the moving direction of the probe when the angle of inclination exceeds 45 degrees. If the stylus tilts as a result, a measurement error will occur in any probes described in the conventional art. Therefore, a guide having as high rigidity as possible is required so that the stylus does not tilt by the lateral force acting on the distal end of the stylus.

Consider Newtonian mechanics, (Eq. 1)

$$F=Ma \qquad (1)$$

where "F" is the measuring force, "M" is the mass of the movable part, and "a" is the response acceleration of the stylus.

In order to have the measuring force "F" as small as possible and the response acceleration "a" as large as possible, the movable part mass, that is, the mass "M" of the small slidably moving shaft part must be made as small as possible. In order to prevent the stylus from tilting with respect to the lateral force, a structure for moving without friction in the moving direction and for realizing extremely high rigidity in the direction perpendicular to the moving direction is necessary.

Through years of research and development, the present inventors have developed a micro-air slide in a cylindrical shape and realized a small slidably moving shaft part having a movable part mass in the 0.2 gram range.

The meaning of the term "micro-air slide" will be described. The small slidably moving shaft part moves through a small air bearing, and the small slidably moving shaft part and the small air bearing are collectively referred to as "micro-air slide". The commercially available air slides include those having the movable part mass of 100 grams for small ones. The "micro-air slide" herein is extremely light and small having a movable part mass in the 0.2 gram range.

In the ultrahigh precision three-dimensional measuring apparatus, which is the technical field of the present invention, the Z-direction has a double structure of a large air slide for driving and greatly moving the entire probe part by flowing current to a coil such that the displacement of the small slidably moving shaft part for moving with very small measuring force becomes zero with respect to the optical probe displacement detecting part including the small air bearing.

If the measuring force is 0.2 mN and the mass of the small slidably moving shaft part is 0.2 grams, the response acceleration of the probe is 0.1 G from the above equation (1). "G" is the gravitational acceleration. With the response acceleration of this level, measurement can be performed at a measuring speed up to 10 mm/sec for a smooth aspheric lens having a diameter of greater than or equal to 30 mm and up to 5 mm/sec for lenses having a diameter of less than or equal to 30 mm.

The micro-air slide is formed into a cylindrical shape to obtain maximum rigidity with minimum mass. The air slide can hold the shaft with high rigidity by forming a film at high air pressure of 2 to 4 atmosphere in the guide part. In the case of cylindrical micro-air slide, a film at high air pressure can be formed at the guide part and high rigidity can be provided even if the micro-air slide is made to have a diameter of smaller than or equal to 4 mm, by forming the gap of the guide part to 10 microns or less with satisfactory precision so that the air flow rate is not large enough to significantly lower the air pressure of the injected air.

However, if the air slide is made small in a rectangular column shape, the corner portions of the rectangular column cannot be made to a narrow gap of less than or equal to 10 microns, and thus the air escapes from the corner portions, whereby the air flow rate increases and high rigidity cannot be realized as the air pressure of the guide part cannot be maintained high. The rigidity can be slightly increased by having portions other than the corner portions to a narrower gap of smaller than or equal to 5 microns and increasing the air pressure of the injected air, but many issues arise such as the rigidity is still inferior in comparison with the case where the air slide is formed into a circular cylinder, and furthermore, processing is difficult, and malfunction possibly occurs due to adhesion of foreign materials to the gap in long time use, and thus the air slide of rectangular column shape is difficult to put into practical use.

The small slidably moving shaft part of the micro-air slide is supported by a spring member, and moves about 10 microns in the Z direction with the measuring force of 0.2 mN, but the shift that occurs when the same force is laterally applied must be made to less than or equal to 10 nanometers. That is, the horizontal to vertical ratio of the probe rigidity of one thousand times is required. The measurement error in the case where the angle of inclination of the measuring surface is 45 degrees then is 10 nm. This is the minimum rigidity required.

Unless all of the above conditions are satisfied, the three-dimensional measurement probe for measuring the shape etc. of the aspheric lens with ultrahigh precision of 0.01 micron order cannot be obtained. Conventionally, only the probes disclosed in the first patent document and the second patent document satisfy the above conditions.

However, the probes disclosed in the first patent document and the second patent document have an issue in that the measuring object can only be measured from above. That is, in FIG. 10, the plate spring 350 is merely placed on a projection formed on the upper surface of the air bearing part 307. In FIG. 11, the plate spring 315 is merely placed on a sphere 53 embedded at the upper end of the air bearing part 317.

Therefore, when such probes are arranged horizontally, the plate spring 350 or 315 separates from the projection or the sphere 53 and the spring property is not exerted, or when arranged upside down, the micro-air slide may drop. That is, due to the configuration of being suspended from above, the measurement can only be performed from above the measuring object. If the measuring object can only be measured from above, a probe cannot measure the front and back of the lens, serving as one example of the measuring object, from above and below or from left and right. This is a first issue of the conventional probes disclosed in the first patent document and the second patent document.

The measuring object can be measured from the side or from below by bonding the plate spring to the air bearing part, but in this case, the plate spring will break if excessive measuring force is applied to the stylus 5 due to erroneous operation and the like. Thus, the plate spring 350 or 315 cannot even be bonded to the air bearing.

Since the distal end of the stylus is normally eccentric, a measurement error will occur if the cylindrical micro-air slide even slightly rotates during the measurement. However, it is impossible to attach the distal end of the stylus so as to completely coincide with the axis of the micro-air slide.

The conventional probes disclosed in the first patent document and the second patent document have an issue that a measurement error occurs if the micro-air slide is even slightly rotated by some kind of impact, since the micro-air slide is prevented from rotating only by the frictional force between the plate spring 350 or 315 and the projection or sphere 53. This is a second issue of the conventional probes disclosed in the first patent document and the second patent document.

There is also an issue that the plate spring is deformed or breaks due to long time use, since the plate spring is extremely thin as the thickness of 10 microns. As only a limited number of people can repair it, the three-dimensional measurement probe tends to be used only by a limited number of people in the measurement room. This is a third issue of the conventional probes disclosed in the first patent document and the second patent document.

The third patent document discloses the entire configuration suitable for mounting the probe according to the present invention, where the optical probe is attached as described above. The optical probe has an advantage of being completely noncontact, but has many disadvantages as described below, and thus is hardly put into practical use in the high precision three-dimensional measurement.

With the optical probe, if the measuring surface of the measuring object is inclined, the reflected light is reflected while being tilted by twice the angle of inclination even when light is irradiated from above the measuring surface. For instance, if the measuring surface is inclined by 60 degrees, the reflected light advances downward at 120 degrees, and thus is completely immeasurable.

Furthermore, the quantity of reflected light in the optical probe changes due to the reflectance of the measuring surface. When the quantity of reflected light is changed, an error occurs due to a shift in the focal position due to offset or stray light in focus servo. Even when an attempt is made to interfere with reference light for length measurement, if the quantity of reflected light significantly changes, correct interference signals cannot be obtained, thereby leading to a measurement error. Moreover, a non-reflecting coated surface cannot be measured.

The optical probe adopts a method in which only the polished surface can be measured and a method in which the polished surface cannot be measured, depending on the surface roughness of the measuring surface. The method in which the polished surface cannot be measured is generally referred to as a trigonometric distance measurement and high precision measurement cannot be performed. The method in which only the polished surface can be measured is a method of having the reflected light from the measuring surface interfere with the reference light, where only the inclined surface at 30 degrees can be measured at the most even if the light path is shifted in accordance with the inclination of the measuring surface, and measurement cannot be performed if a dust or scratches are present on the measurement path, and thus measurement is extremely difficult.

The inventions of the first patent document and the second patent document resulted from great difficulty with the optical probe shown in the third patent document, but the first patent document and the second patent document have the first to third issues described above. The probe according to the first patent document and the second patent document can be mounted to the tip of the optical probe 112 according to the third patent document shown in FIG. 5B. It should be noted that the lens at the distal end of the optical probe 112 is different from the lens 14 in the first patent document. The present invention aims to solve the first to third issues of the first patent document and the second patent document.

The fourth patent document has a configuration of holding the own weight of an air slide 62 with a magnetic circuit including a magnet 418, a coil 419, and a yoke 417, as shown in FIG. 12. In this document, no description is made on whether the air slide 62 is in a circular cylindrical shape or in a rectangular column shape. However, the configuration of the magnetic circuit has a movable yoke (described as mirror fixing piece in the fourth patent document) 415 of a substantially square shape as shown in FIG. 13, where the magnetic circuit moves in a direction of smaller magnetic resistance if the air slide 62 is in a circular cylindrical shape, and thus the movable yoke 415 rotates until attaching to the fixing yoke 417 and does not operate as a probe 419. Therefore, the air-slide 62 must be a rectangular column.

If the air slide according to the fourth patent document is in a rectangular column shape, a light and highly rigid probe cannot be manufactured due to the above reasons. Furthermore, if the air slide is in a circular cylindrical shape, the yokes of the movable part and the fixed part attach to each other after rotation and thus do not operate as a probe.

In the fourth patent document, a guide 424 having a bearing is driven with a Z driving screw 47 of the Z axis. Aside from the problem of bearing sphericity, the bearing guide 424 will not operate while maintaining straightness unless the bearing is pressed thereagainst, but frictional force becomes necessary for driving due to such pressing force, and the optical probe displacement detecting part will tilt when the driving direction is changed unless the driving position is exactly at the center of gravity.

As shown in FIG. 12 of the fourth patent document, when the Z axis is driven with the Z drive screw 47, the lateral force caused by eccentricity of the screw is applied, thereby degrading the movement straightness. The eccentricity of the screw cannot be made to zero.

Furthermore, a backlash of a few microns is always necessary for the screw, and when the screw is strongly tightened to eliminate such a backlash, the screw will be fastened too tightly and will not move. Therefore, the focus servo cannot be applied with a precision of sub-microns.

In the fifth patent document, the air slide has a circular cylindrical shape. As shown in FIGS. 14A and 14B, the axial movement is controlled by a magnet (magnetic body fixed to a probe shaft 533) 535 and a coil 536, and a groove 534 is cut on the shaft 533 (refer to groove processing of FIG. 14B) to stop the rotation of the shaft 533 by flow of air. However, the movable part mass becomes large in such a configuration because the long magnetic body 535 is attached to the air slide shaft 533. If the magnetic body 535 is made of iron and the air slide 533 is made of aluminum, the movable part mass becomes greater than or equal to three times, since the iron has a specific gravity of three times that of aluminum, and thus a light and highly rigid probe cannot be obtained. Furthermore, the groove 534 must be processed in the shaft 533 without creating burrs with satisfactory precision in accordance with the air ejecting part, thereby leading to an increase in cost.

SUMMARY OF THE INVENTION

An object of the present invention is to solve the above-described issues in the conventional art and to provide a three-dimensional measurement probe, that is less likely to break, that is of long lifespan, and that is not so difficult to manufacture, for measuring the shape etc. of an aspheric lens and the like with ultrahigh precision of 0.01 micron order, that is, using a micro-air slide with low measuring force of 0.1 to 0.3 mN and a vertical to horizontal ratio of rigidity of one thousand times and eliminating errors caused by rotation of the distal end of the stylus.

In accomplishing these and other aspects, according to a first aspect of the present invention, there is provided a three-dimensional measurement probe comprising:

a cylindrical small slidably moving shaft part having one end arranged with a stylus for contacting a surface of a measuring object to be measured and another end arranged with a magnetic pin;

a small air bearing part provided with a cylindrical hole that fits with the small slidably moving shaft part, and including an air outlet forming a compressed air film in a gap with the small slidably moving shaft part;

a magnetic force generating part for generating magnetic force for preventing movement in a Z direction or axial direction of the cylindrical small slidably moving shaft part and a rotating direction about the Z direction by constructing a magnetic circuit with a magnet arranged at the end of the small air bearing part and a plurality of yokes in a non-contact manner with the pin;

a displacement detecting part for detecting a displacement in the Z direction of the small slidably moving shaft part with respect to the small air bearing part;

a Z stage for guiding the movement in the Z direction of the small air bearing part; and a Z stage driving device for driving the Z stage such that the displacement in the Z direction becomes substantially constant when moving one of the measuring object and the Z stage in XY directions orthogonal to the Z direction and orthogonal to each other and when moving the stylus in the Z direction along a shape of the measuring object.

According to a second aspect of the present invention, there is provided a three-dimensional measurement probe according to the first aspect, characterized in that at least one yoke of the plurality of yokes is a ring-shaped yoke.

According to a third aspect of the present invention, there is provided a three-dimensional measurement probe according to any one of the first and second aspects, wherein shapes of the pin and the yoke in vicinity of the gap have a taper that is thick in the Z direction and thin in the rotating direction, that is, a shape near a gap of the pin and the yoke has a constant thickness in the Z direction and forms a taper from a center-side to an end-side at both ends of the pin in a longitudinal direction of the pin.

According to a fourth aspect of the present invention, there is provided a three-dimensional measurement probe according to any one of the first to third aspects, wherein the yoke is thicker than the pin in shapes near a gap of the pin and the yoke.

According to a fifth aspect of the present invention, there is provided a three-dimensional measurement probe according to any one of the first to third aspects, wherein the displacement detecting part is configured by an optical probe displacement detecting part comprising at least a semiconductor laser integrally fixed with the small air bearing part, for emitting a laser beam; a mirror arranged in the small slidably moving shaft part, for being irradiated with the laser beam from the semiconductor laser and reflecting the laser beam; a lens for collecting the laser beam from the semiconductor laser on the mirror; and a light detector for receiving the reflected light from the mirror; and the laser beam from the semiconductor laser is irradiated on the mirror, the reflected light from the mirror is received by the light detector, and a displacement in the Z direction is detected from an output signal of the light detector.

According to a sixth aspect of the present invention, there is provided a three-dimensional measurement probe according to the fifth aspect, further comprising an oscillation frequency stabilizing laser for emitting an oscillation frequency stabilizing laser beam, and a Z coordinate measuring part for irradiating the oscillation frequency stabilizing laser beam emitted from the oscillation frequency stabilizing laser on the mirror of the displacement detecting part, and measuring a Z coordinate of the mirror from the reflected light reflected by the mirror.

According to a seventh aspect of the present invention, there is provided a three-dimensional measurement probe according to any one of the first to sixth aspects, further comprising a non-magnetic stopper for stopping excessive movement of the small slidably moving shaft part when force exceeding the magnetic force that prevents the movement in the Z direction of the small slidably moving shaft part with respect to the small air bearing part and the rotating direction with the Z direction as an axis is applied in one of the Z direction of the small slidably moving shaft part and the rotating direction with the Z direction as an axis.

According to an eighth aspect of the present invention, there is provided a three-dimensional measurement probe according to any one of the first to seventh aspects, wherein the Z stage is configured by an air bearing.

According to a ninth aspect of the present invention, there is provided a three-dimensional measurement probe according to any one of the first to eighth aspects, wherein the Z stage driving device is configured by a coil connected to the Z stage and a magnetic circuit for driving the Z stage in the Z direction by flowing current to the coil.

According to a 10th aspect of the present invention, there is provided a three-dimensional measurement probe according to any one of the first to ninth aspects, wherein a movable part of the Z stage is supported by a constant load spring including a thin plate wound in a spiral form to generate tensile force substantially equal to a weight of the movable part.

According to an 11th aspect of the present invention, there is provided a three-dimensional measurement probe comprising:

a cylindrical small slidably moving shaft part having one end arranged with a stylus for contacting a surface of a measuring object to be measured and another end arranged with a magnetic pin;

a small air bearing part provided with a cylindrical hole that fits with the small slidably moving shaft part, and including an air outlet forming a compressed air film in a gap with the small slidably moving shaft part;

a magnetic force generating part for generating magnetic force for preventing movement in a Z direction or axial direction of the cylindrical small slidably moving shaft part and a rotating direction about the Z direction by constructing a magnetic circuit with a magnet arranged at the end of the small air bearing part and a plurality of yokes in a non-contact manner with the pin, at least one yoke of the plurality of yokes being a ring-shaped yoke, a shape near a gap of the pin and the yoke having a constant thickness in the Z direction and forming a taper from a center-side to an end-side at both ends of the pin in a longitudinal direction of the pin, the yoke being thicker than the pin in shapes near a gap of the pin and the yoke;

a displacement detecting part for detecting a displacement in the Z direction of the small slidably moving shaft part with respect to the small air bearing part, the displacement detecting part being configured by an optical probe displacement detecting part comprising at least a semiconductor laser integrally fixed with the small air bearing part, for emitting a laser beam, a mirror arranged in the small slidably moving shaft part, for being irradiated with the laser beam from the semiconductor laser and reflecting the laser beam, a lens for collecting the laser beam from the semiconductor laser on the mirror, and a light detector for receiving the reflected light from the mirror;

a Z stage for guiding the movement in the Z direction of the small air bearing part, the Z stage being configured by an air bearing;

a Z stage driving device for driving the Z stage such that the displacement in the Z direction becomes substantially constant when moving one of the measuring object and the Z stage in XY directions orthogonal to the Z direction and orthogonal to each other and when moving the stylus in the Z direction along a shape of the measuring object, the Z stage driving device being configured by a coil connected to the Z stage and a magnetic circuit for driving the Z stage in the Z direction by flowing current to the coil, a movable part of the Z stage being supported by a constant load spring including a thin plate wound in a spiral form to generate tensile force substantially equal to a weight of the movable part;

an oscillation frequency stabilizing laser for emitting an oscillation frequency stabilizing laser beam;

a Z coordinate measuring part for irradiating the oscillation frequency stabilizing laser beam emitted from the oscillation frequency stabilizing laser on the mirror of the displacement detecting part, and measuring a Z coordinate of the mirror from the reflected light reflected by the mirror; and a non-magnetic stopper for stopping excessive movement of the small slidably moving shaft part when force exceeding the magnetic force that prevents the movement in the Z direction of the small slidably moving shaft part with respect to the small air bearing part and the rotating direction with the Z direction as an axis is applied in one of the Z direction of the small slidably moving shaft part and the rotating direction with the Z direction as an axis, wherein the laser beam from the semiconductor laser is irradiated on the mirror, the reflected light from the mirror is received by the light detector, and a displacement in the Z direction is detected from an output signal of the light detector.

Therefore, according to the three-dimensional measurement probe of the present invention, the rotation and the axial movement can be restricted in a non-contacting manner by the magnetic circuit constructed by the magnetic pin of small movable part mass, the magnet attached to the small air bearing part, and the yoke, thereby resolving an issue of error production by rotation, which was the drawback of the cylindrical air slide in which maximum lateral rigidity is obtained with minimum movable part mass, and an issue that the measuring object can only be measured from above since the probe has to be suspended with a thin plate spring in the conventional art, as well as an issue that the thin plate spring easily breaks due to long time use.

Therefore, the three-dimensional measurement probe of higher precision and less likely to break even in long time use is obtained. Since assembling and handling are facilitated, the measuring apparatus can be provided in factory sites and easily used as opposed to the measuring apparatus that can only be used by a limited number of people in the measurement room as in the conventional art, by using the probe according to the present invention.

Since suspension by a spring is not necessary, the shape of the measuring object can be measured not only from above, but also from below or right and left, where tilt and eccentricity of the front and back surfaces can be measured with ultrahigh precision in measuring an aspheric lens. In the conventional art, however, an aspheric lens can only be measured from above the aspheric lens. Hence, the shape of the surface can be measured but the positional relationship of the upper surface, the lower surface, and the side surface cannot be easily measured, and thus a high precision lens cannot be manufactured. According to the present invention, however, the three-dimensional measurement probe capable of measuring the aspheric lens with ultrahigh precision from below and from the side can be obtained.

Therefore, performance and quality as well as production yield can be enhanced for the lenses of cameras with which thinning and higher image quality are being pushed forward, optical discs which have become increasingly high-capacity, and the like.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1A:
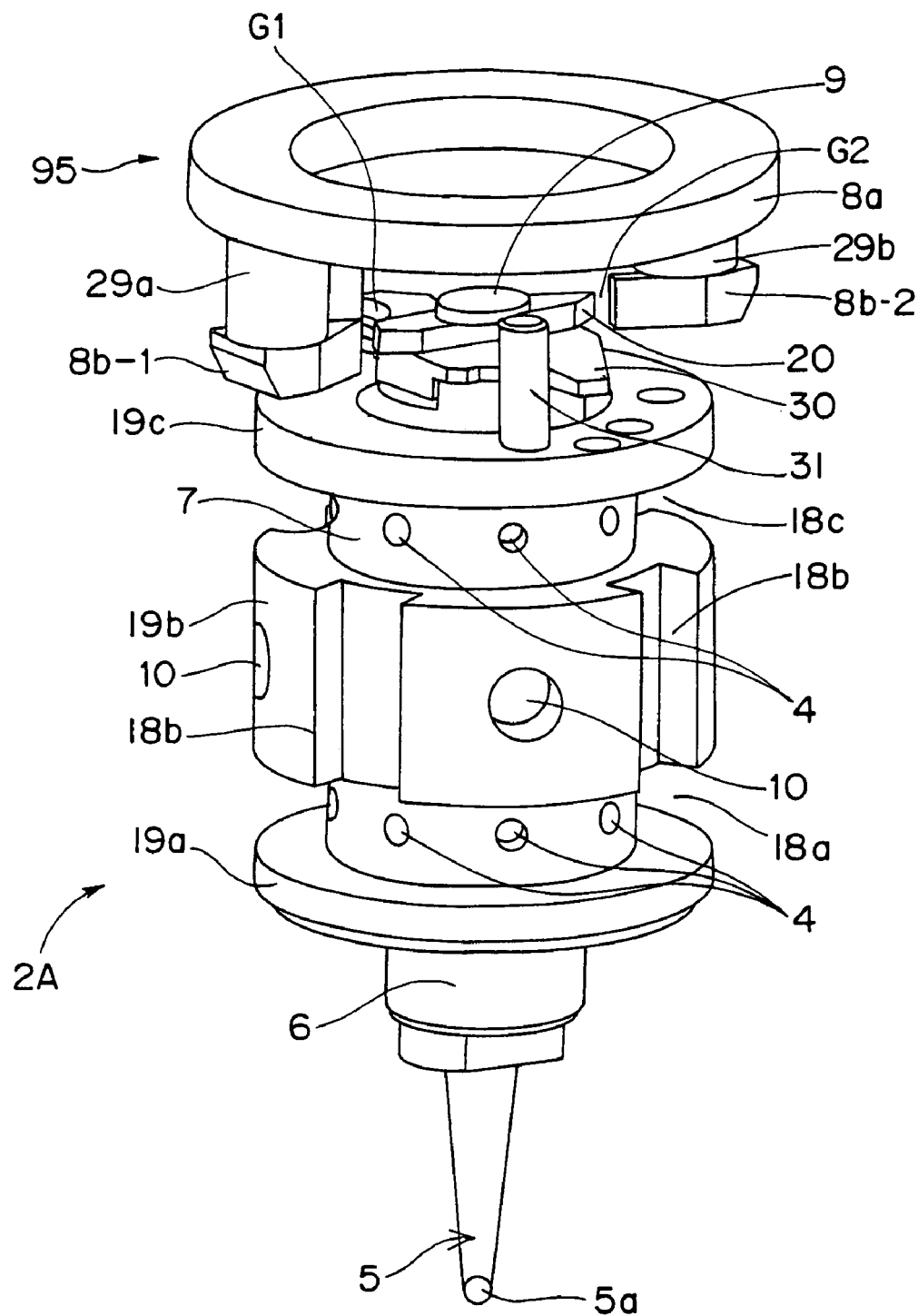
FIG. 1A is an enlarged view of a main part of a three-dimensional measurement probe according to an embodiment of the present invention.

Before the description of the present invention proceeds, it is to be noted that like parts are designated by like reference numerals throughout the accompanying drawings.

Embodiments according to the present invention will now be described in detail with reference to the drawings.

Embodiment

Figure 1B:
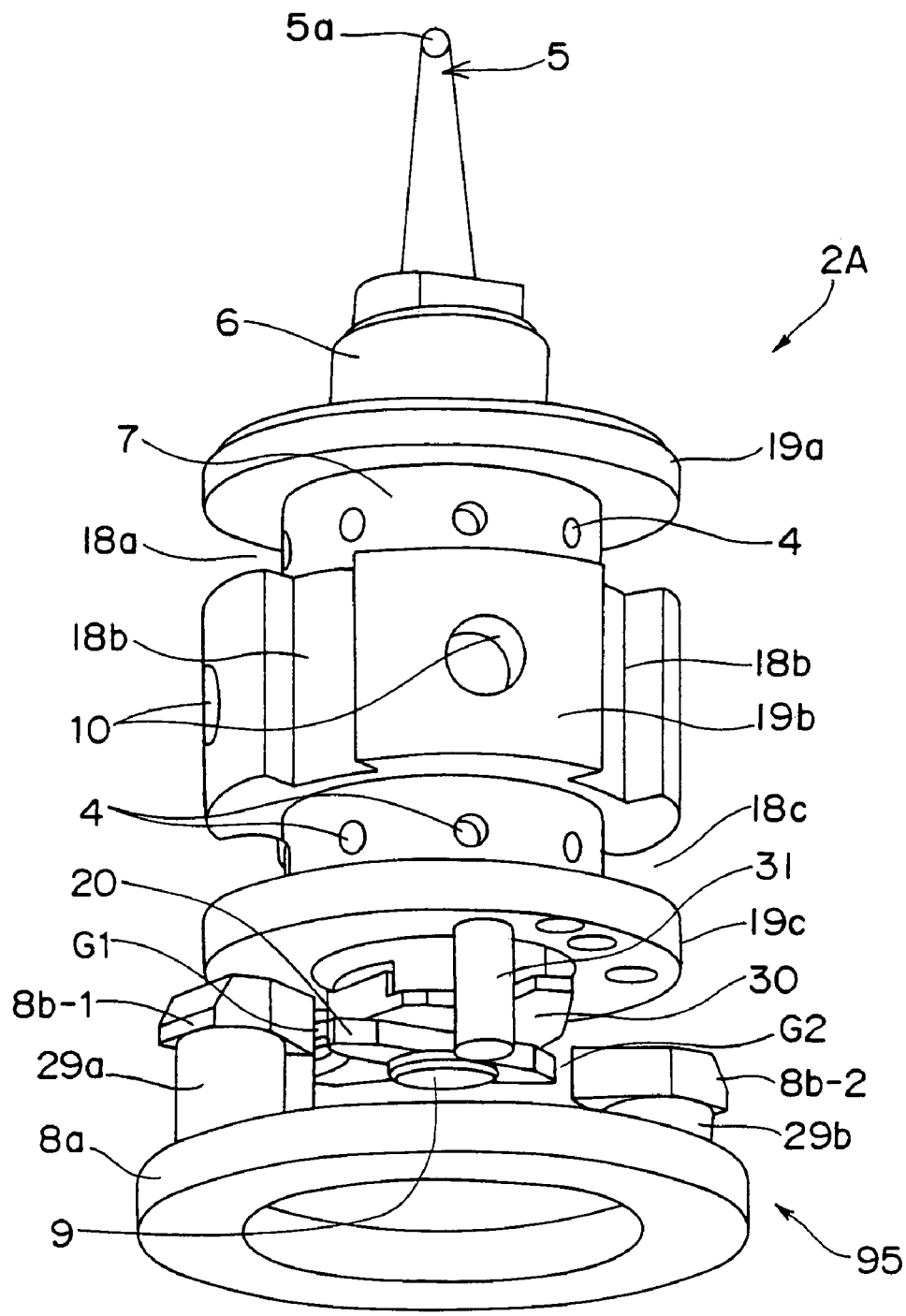
FIG. 1B is an enlarged view of a main part of the three-dimensional measurement probe according to the embodiment of the present invention.
Figure 3A:
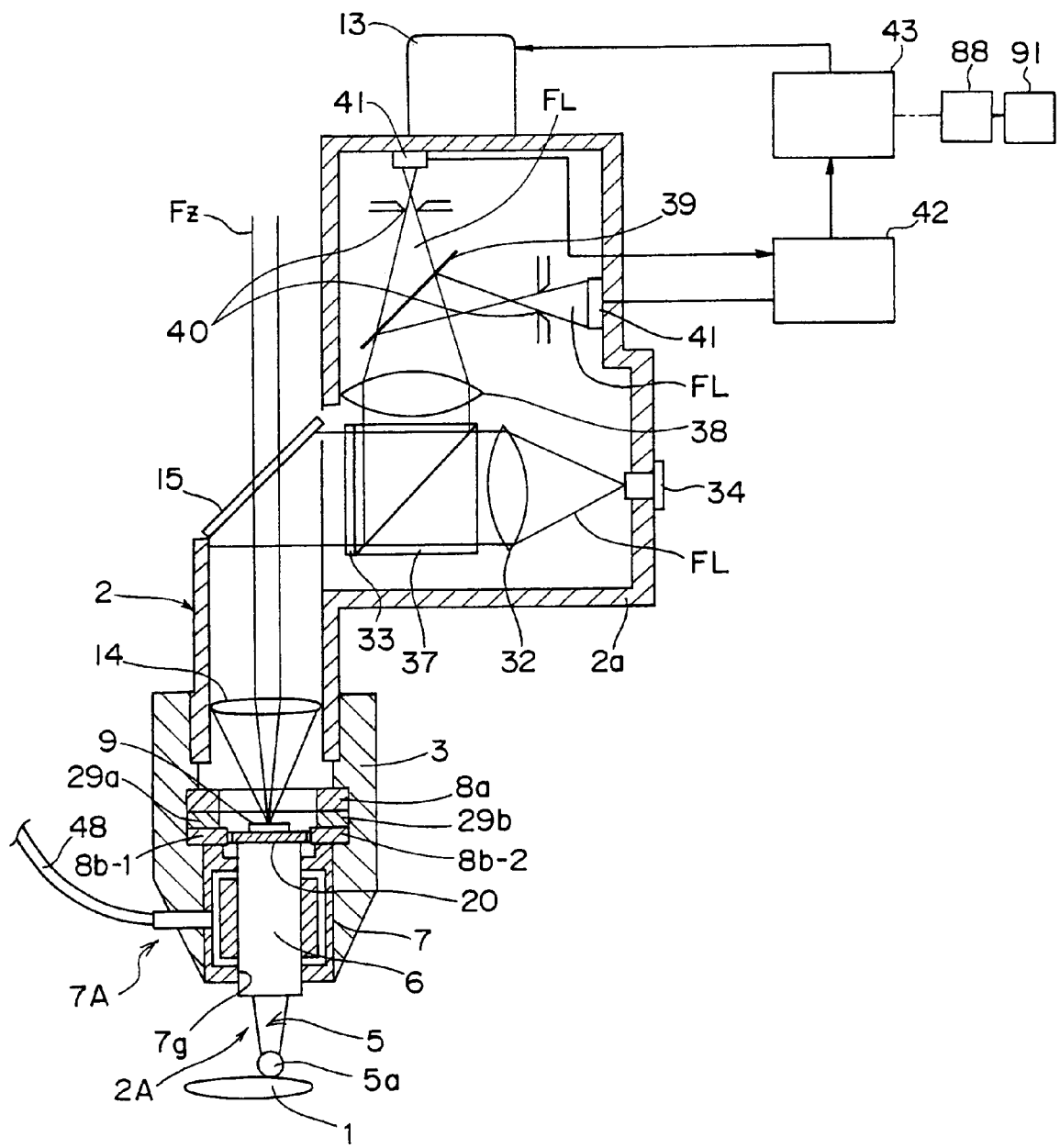
FIG. 3A is a schematic configuration explanatory view including an optical probe displacement detecting part on the upper side of the three-dimensional-measurement probe according to the embodiment of the present invention.

FIGS. 1A and 1B show a configuration of a main part of a three-dimensional measurement probe 2A of an ultrahigh precision three-dimensional measuring apparatus to which the three-dimensional measurement probe 2A according to an embodiment of the present invention can be attached. FIGS. 1A and 1B show the same probe 2A, where FIG. 1A shows the arrangement of the probe 2A when measuring a surface S of a measuring object 1 from above and FIG. 1B shows the arrangement when measuring the surface S of the measuring object 1 from below. Although not illustrated, the probe 2A can be arranged on the side or diagonally with respect to the measuring object 1. FIG. 3A is a schematic configuration explanatory view including an optical probe displacement detecting part on the upper side of the three-dimensional measurement probe according to the embodiment, and FIG. 3B illustrate a state in which FIG. 3A is seen upside down and is a schematic configuration explanatory view including an optical probe displacement detecting part on the lower side of the three-dimensional measurement probe according to the embodiment.

Figure 3B:
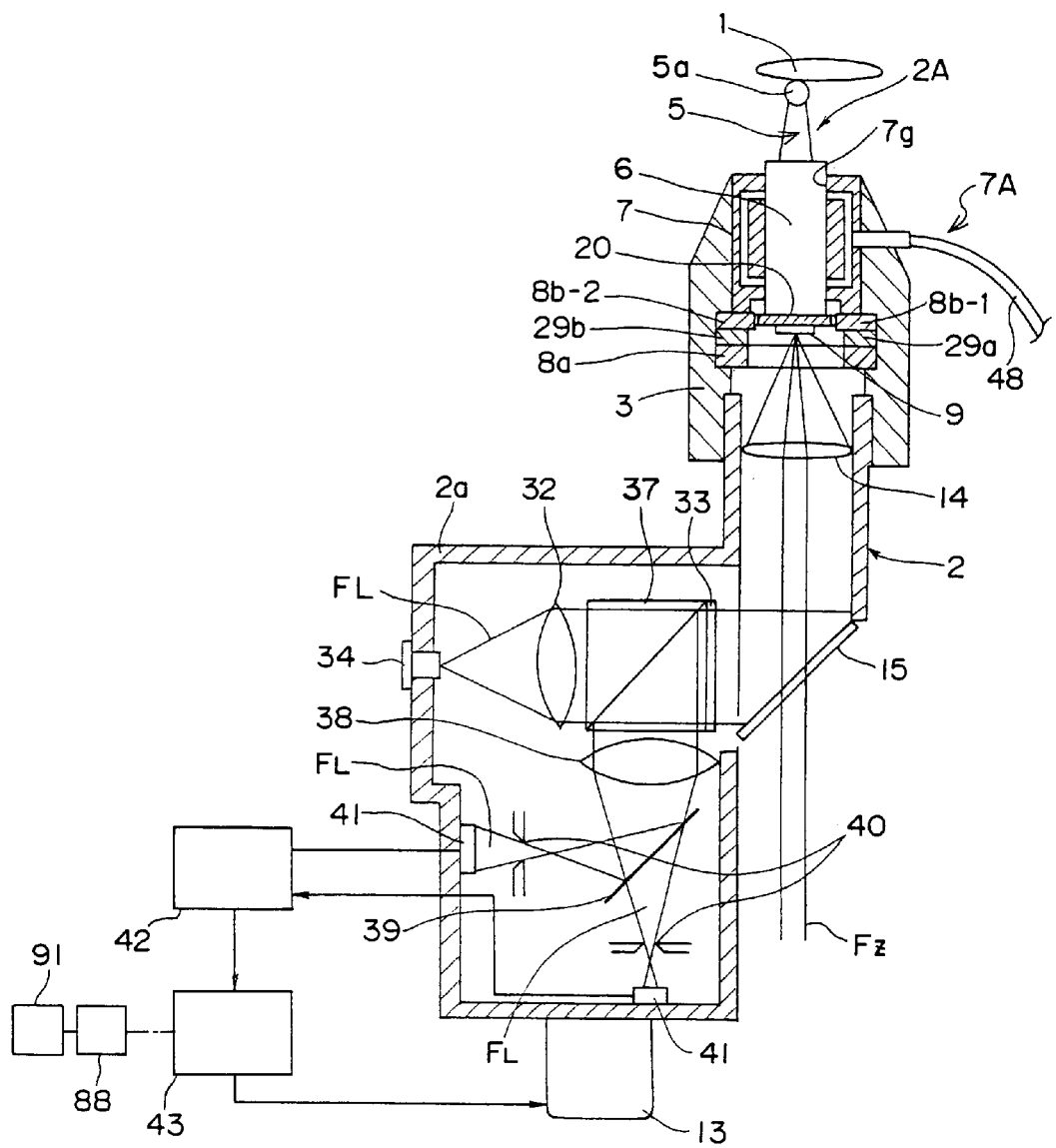
FIG. 3B is a schematic configuration explanatory view including an optical probe displacement detecting part on the lower side of the three-dimensional measurement probe according to the embodiment of the present invention.

When measuring the surface S of the measuring object 1 from below, an object holding member 98 is configured into, e.g., a ring shape to hold the periphery of the measuring object 1 and is configured so that the back surface other than the periphery of the measuring object 1 can be measured from the lower side, and furthermore, the probe 2A shown in FIG. 3B is arranged below the measuring object 1 and arranged so that the optical probe displacement detecting part on the lower side can be moved independently of the optical probe displacement detecting part on the upper side, whereby both front and back surfaces can be simultaneously measured from above and below the measuring object 1.

The three-dimensional measurement probe 2A according to the present embodiment is constructed by including a small slidably moving shaft part 6 of a cylindrical shape, a small air bearing part 7A, a magnetic force generating part 95, an optical probe displacement detecting part 2 serving as one example of the displacement detecting part, a large air slide (in this specification, the larger air slide indicates an air slide with a larger size construction than the micro-air slide. The larger air slide can be named as a "first air slide" and the micro-air slide can be named as a "second air slide" smaller than the first air slide in size.) (large air slide configured by a Z direction large air slide guide 35 and a large air slide movable part 11) 89 serving as one example of a Z stage, and a Z direction driving device 43 serving as one example of a Z stage driving part. That is, the probe 2A includes a magnetic pin 20 of the mass of a small movable part attached to the small slidably moving shaft part 6 integrally fixed with a stylus 5 of a cylindrical micro-air slide, and a magnetic force generating part 95 that constitutes a micro-air slide-use magnetic circuit MC by magnets (micro-air slide-use magnets) 29a, 29b and plural yokes (micro-air slide-use yokes) 8a, 8b-1, 8b-2 attached to an end of the small air bearing part 7A in a non-contact manner, for generating a magnetic force for preventing the axial movement and rotation (movement in the Z direction that is an axial direction of the cylindrical small slidably moving shaft part, and movement in a rotary direction around the Z direction) in a non-contact manner, and a Z direction driving device 43 for moving the entire Z direction so that the displacement of the micro-air slide becomes almost constant, whereby the measuring object 1 can be measured from below and from the side.

The meaning of the term "micro-air slide" will again be described. The small slidably moving shaft part 6 moves through the small air bearing 7, and the small slidably moving shaft part 6 and the small air bearing 7 are collectively referred to as the "micro-air slide". The commercially available air slides include those having the movable part mass of at least 100 grams. The "micro-air slide" in the present embodiment is extremely light and small having a movable part mass in the 0.2 gram range.

In the ultrahigh precision three-dimensional measuring apparatus according to the present embodiment, provided in the Z direction is a double structure of the large air slide for driving and greatly moving the entire optical probe displacement detecting part 2 by flowing current to a coil 13 such that the displacement of the small slidably moving shaft part 6 for moving with very small measuring force becomes zero with respect to the optical probe displacement detecting part 2 including the small air bearing 7. The optical probe displacement detecting part 2 detects a displacement in the Z direction of the small air bearing 7 with respect to the small air bearing part 7A.

Assuming that the measuring force is 0.2 mN and the mass of the small slidably moving shaft part 6 is 0.2 grams, the response acceleration of the probe 2A is 0.1 G from the above-mentioned equation (1). "G" is the gravitational acceleration. With the response acceleration of this level, measurement can be performed at a measuring speed up to 10 mm/sec for a smooth aspheric lens having a diameter of greater than or equal to 30 mm serving as one example of the measuring object 1 and up to 5 mm/sec for lenses having a diameter of less than or equal to 30 mm.

The micro-air slide is formed into a cylindrical shape to obtain maximum rigidity with minimum mass. The air slider can hold the shaft with high rigidity by forming a film at high air pressure of 2 to 4 atmosphere in the guide part. In the case of cylindrical micro-air slide, a film at high air pressure can be formed at the guide part and high rigidity can be provided even if the diameter is made to smaller than or equal to 4 mm, by forming the gap of the guide part narrow as to be smaller than or equal to 10 microns with satisfactory precision so that the air flow rate is not large enough to significantly lower the air pressure of injected air.

The small slidably moving shaft part 6 of the micro-air slide is supported by a spring member, and moves about 10 microns in the Z direction with the measuring force of 0.2 mN, but the shift that occurs when the same force is laterally applied must be made to less than or equal to 10 nanometers. That is, the horizontal to vertical ratio of the probe rigidity of one thousand times is required. Then, the measurement error to be generated when the angle of inclination of the measuring surface is 45 degrees is 10 nm. This is the minimum rigidity required. This configuration will be described later.

The small slidably moving shaft part 6 connected and fixed on the basal end side of the stylus 5 having a stylus distal end sphere 5a for contacting the measuring surface S of the measuring object 1 that is attached at the distal end is processed into a high precision cylindrical shape of sub-micron level. The small slidably moving shaft part 6 can slidably move through a cylindrical hole 7g of the small air bearing 7 processed with high precision into such a shape that the small slidably moving shaft part 6 is fitted with a gap of less than or equal to 10 microns without generating friction in the Z direction (axial direction of small slidably moving shaft part 6) and the rotating direction around the Z direction as the axis by the compressed air film.

As shown in FIGS. 1A to 2A, the small air bearing 7 has concave parts 18b in the peripheral direction at predetermined intervals, and has small air bearing outer walls 19 with annular concave parts 18c, 18a on the upper and lower sides in the axial direction assembled in a closely attached manner into the interatomic force probe frame 3, thereby forming air reserving parts 18, respectively. That is, the small air bearing outer wall 19 of the small air bearing 7 is configured by a flange part 19a on the stylus side (distal end side), an intermediate part 19b, and a flange part 19c on the basal end side, where the annular concave part 18a on the distal end side is formed between the flange part 19a on the distal end side and the intermediate part 19b, the annular concave part 18c on the basal end side is formed between the flange part 19c on the basal end side and the intermediate part 19b, and the air reserving part 18 is formed by the concave parts 18b at predetermined intervals formed on the outer peripheral surface of the intermediate part 19b, the annular concave part 18a on the distal end side, and the annular concave part 18c on the basal end side. The compressed air sent through a tube 48 shown in FIGS. 3A and 3B connected to a compressor (not shown) from the compressor enters the air reserving part 18, sent to a gap of the fitting-in of the small slidably moving shaft part 6 and the hole 7g of the small air bearing 7 from microscopic holes of air outlets 4 serving as one example of an air outlet part thereby forming the compressed air film, and then the air passes through the gap, and is discharged from air exhaust ports 10 radially penetrated through the intermediate part 19b of the small air bearing outer wall 19 at predetermined intervals and from above and below (from the distal end side and the basal end side of) the flange parts 19a, 19c. Since the small air bearing 7 and the interatomic force probe frame 3 are closely attached and fixed, they are collectively referred to as a small air bearing part (small air bearing unit) 7A.

Since the gap of the fitting-in between the small slidably moving shaft part 6 and the small air bearing 7 is extremely narrow as 5 to 10 microns, the compressed air of greater than or equal to 2 atmosphere is supplied from microscopic holes of a great number of air outlets 4 arranged in the circumferential direction and the axial direction at substantially equal intervals on the outer peripheral side surface of the small air bearing 7, and a film having a pressure gradient of the compressed air is formed in the gap before the compressed air is exhausted from the air exhaust ports 10 and from above and below (from the distal end side and the basal end side of) the flange parts 19a and 19c.

When lateral force is applied to the stylus 5 by the measuring force of the inclined measuring surface S of the measuring object 1, the air becomes difficult to flow and thus the air pressure increases when the film thickness of the compressed air is to change, that is, if the film thickness becomes thinner, whereas the air easily flows and the air pressure lowers when the film thickness becomes thicker, and thus, force acts in the direction in which the air film thickness does not change. This is the principle that provides rigidity of the air bearing.

An elongate magnetic pin 20 attached at the other end (end on the side opposite to the stylus 5) of the small slidably moving shaft part 6 along a direction orthogonal to the axial direction of the small slidably moving shaft part 6 constitutes a magnetic circuit MC as described below with a pair of yokes 8b-1, 8b-2 attached to the interatomic force probe frame 3, a pair of magnets 29a, 29b having the yokes 8b-1, 8b-2 fixed to the end face on the stylus side and arranged opposite to each other, and a ring-shaped yoke 8a. That is, a magnetic force generating part 95 for generating the magnetic force for preventing movement in the Z direction or the axial direction of the cylindrical small slidably moving shaft part 6 and the rotating direction about the Z direction is configured by constituting the magnetic circuit MC by the pair of magnets 29a, 29b, the ring-shaped yoke 8a, and the pair of yokes 8b-1, 8b-2 attached to the end of the small air bearing 7 with the magnetic pin 20 in a non-contacting manner. According to such a configuration, the magnetic flux generated from one magnet 29a passes through the magnetic pin 20 through one yoke 8b-1 and one gap G1 formed between the one yoke 8b-1 and one end of the magnetic pin 20, then through the other gap G2 formed between the other end of the magnetic pin 20 and the other yoke 8b-2, through the other yoke 8b-2, and through the ring-shaped yoke 8a with the magnetic flux generated from the other magnet 29b, and again returns to the former magnet 29a.

Figure 2A:
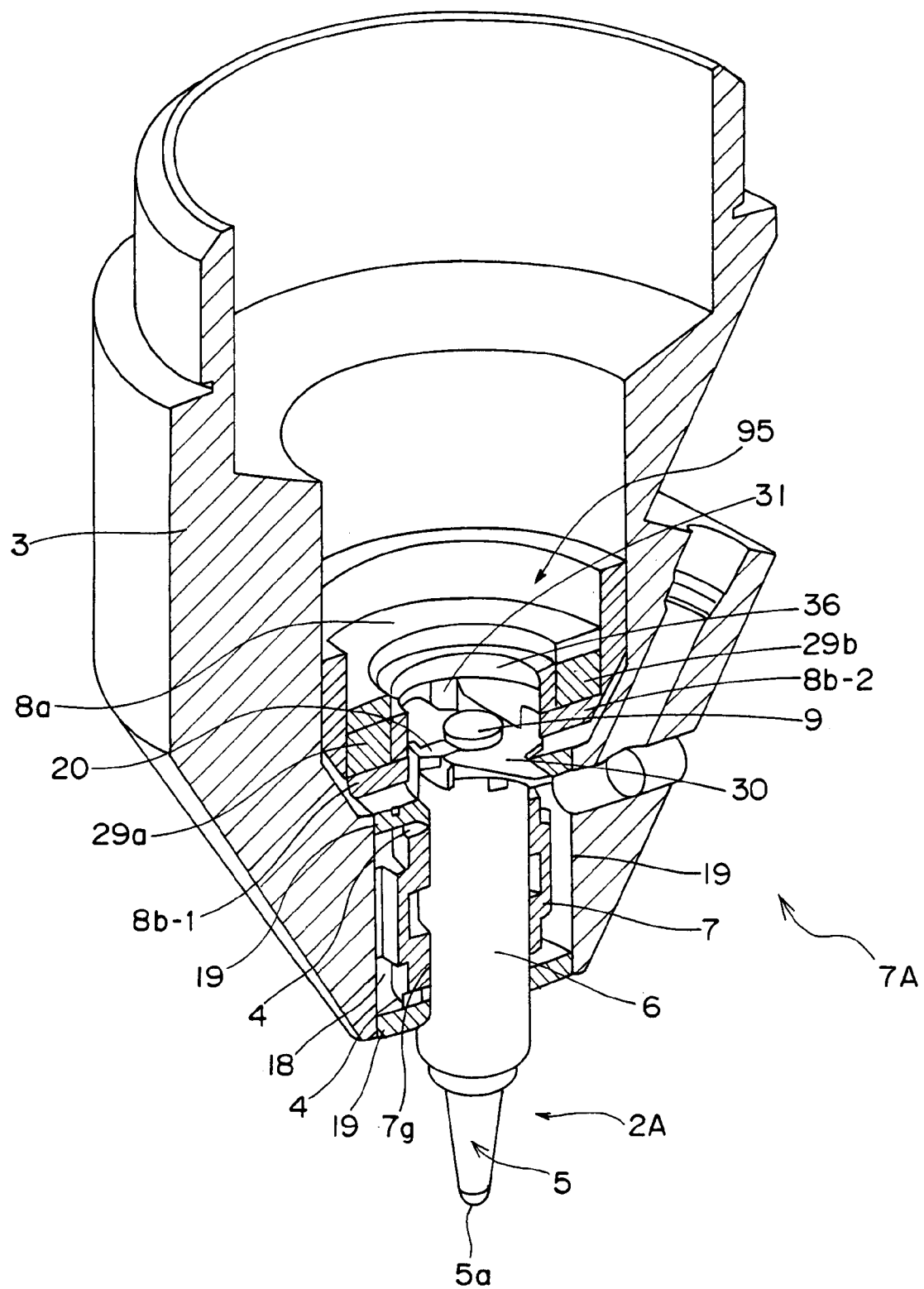
FIG. 2A is a view showing an interatomic force probe frame attached to the main part of the three-dimensional measurement probe according to the embodiment of the present invention.
Figure 2B:
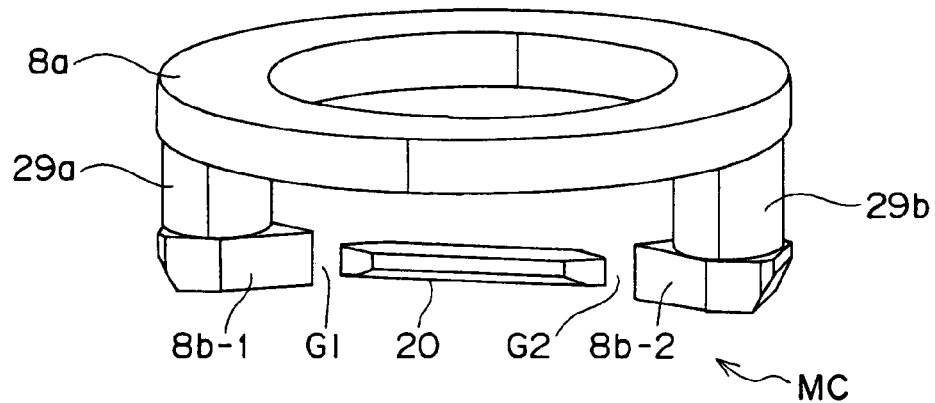
FIG. 2B is a perspective view of a main part of the three-dimensional measurement probe according to the embodiment of the present invention, showing a relationship between a ring-shaped yoke and a magnetic pin.
Figure 2C:
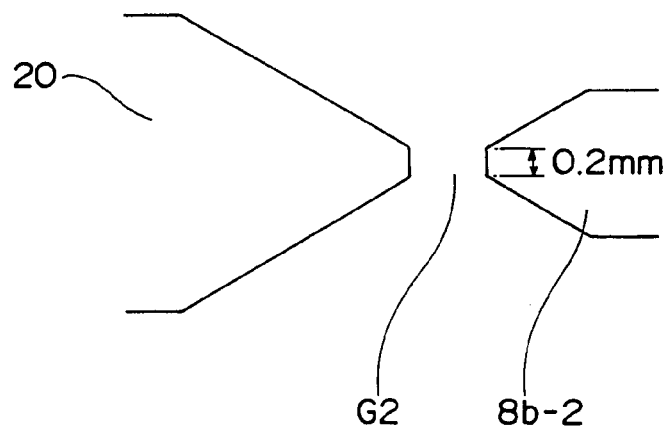
FIG. 2C is a bottom view of a main part of the three-dimensional measurement probe according to the embodiment of the present invention, showing a relationship between a distal end of another yoke different from the ring-shaped yoke and the distal end of the magnetic pin.
Figure 2D:
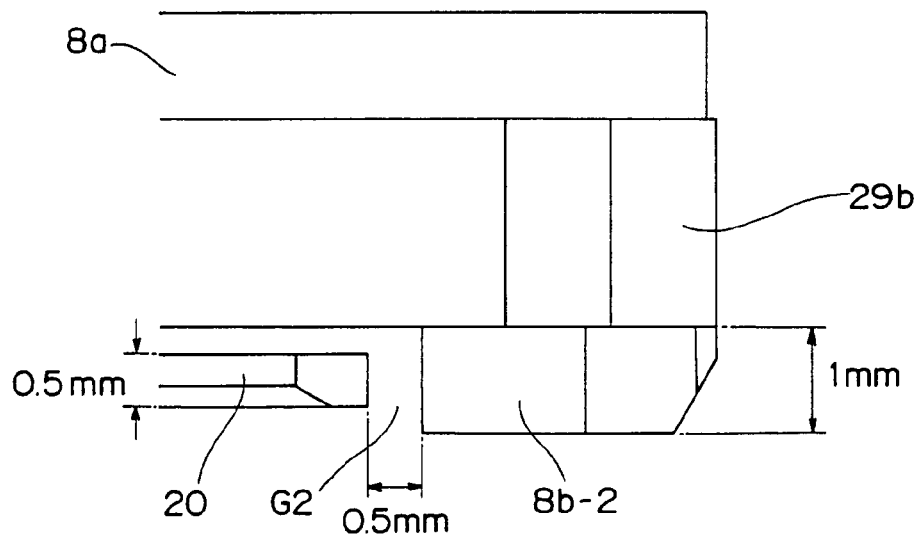
FIG. 2D is a side view of the main part of the three-dimensional measurement probe according to the embodiment of the present invention, showing the relationship between the distal end of another yoke different from the ring-shaped yoke and the distal end of the magnetic pin.

Near the gaps G1, G2 of the magnetic pin 20 and the yokes 8b-1, 8b-2, the magnetic pin 20 and the respective yokes 8b-1, 8b-2 have a tapered shape that is thick in the axial direction and thin in the rotating direction (has inclined surface (forms in a taper shape) having a constant thickness in the axial direction and a width inclined in the radial direction from the center side towards the peripheral end side with the width gradually decreasing at both ends of the magnetic pin 20, as shown in FIGS. 2B to 2D), where the displacement in the rotating direction is strongly suppressed and the displacement in the axial direction is weakly suppressed by such a shape. As shown in FIGS. 2B to 2D, the yokes 8b-1, 8b-2 are made thicker than the magnetic pin 20 for the shapes of the magnetic pin 20 and the yokes 8b-1, 8b-2 near respective gaps G1, G2 of the magnetic pin 20 and the yokes 8b-1, 8b-2. The magnetic pin 20 is arranged so that the longitudinal direction lies in the up and down direction, and as shown in FIGS. 2B and 2C, the pin thickness is 0.5 mm, the yoke thickness is 1 mm, the distal end width in the rotating direction is 0.2 mm, and the gap is 0.5 mm, so that the small slidably moving shaft part 6 shifts in the axial direction by about 100 microns by its own weight so as to balance with the magnetic force. If the magnetic pin 20 is arranged so that the longitudinal direction of the magnetic pin 20 lies in a lateral direction orthogonal to the up and down direction, the weight of the small slidably moving shaft part 6 does not act in the lateral direction, and thus is balanced at the position where the magnetic flux passes most satisfactorily.

In FIGS. 3A and 3B, the optical probe displacement detecting part (the optical probe displacement detecting unit) 2 includes: at least a semiconductor laser 34 integrally fixed with the small air bearing part 7A, for emitting a laser beam; a mirror 9 arranged in the small slidably moving shaft part 6, irradiated with the laser beam from the semiconductor laser 34 and reflecting the laser beam; a lens 14 for collecting the laser beam from the semiconductor laser 34 on the mirror 9; and a light detector 41 for receiving the reflected light from the mirror 41. According to the above construction, the laser beam from the semiconductor laser 14 is irradiated on the mirror 9, the reflected light from the mirror 9 is received by the light detector 41, and displacement in the Z direction is detected from an output signal of the light detector 41. More specifically, the semiconductor laser beam $F_L$ from the semiconductor laser 34 of the wavelength 780 nm attached to the optical probe displacement detecting part (optical probe displacement detecting unit) 2 passes through a lens 32, a polarization prism 37, and a wavelength plate 33 and is totally reflected by a dichroic mirror 15, fully entered through the opening of the lens 14, and then narrowed by the lens 14 and irradiated on a mirror (Z mirror) 9 fixed on the magnetic pin 20. The reflected light from the mirror 9 is totally reflected by each of the dichroic mirror 15 and the polarization prism 37, branched into two by the half mirror 39, and then respectively passed through pin holes 40 arranged near two focal points to enter two light detectors 41. When the small slidably moving shaft part 6 moves in the axial direction by the measuring force on the stylus 5, the focal position of the reflected light from the mirror 9 changes, whereby a focus error signal is generated from the outputs of the two light detectors 41 in a focus error signal detecting part 42, based on the focus error signal, currents are simultaneously flowed to left and right coils 13 on both sides of the movable part 11 of the large air slide 89 by the Z direction driving device 43 functioning as one example of the Z stage driving device for driving forward and backward along the Z direction the optical probe displacement detecting part 2, and the optical probe displacement detecting part 2 is moved forward and backward along the Z direction so that the focus error signal becomes zero. At this time, the large air slide 89 guides the movement of the small air bearing part 7A in the Z direction. When the measuring object 1 or the large air slide 89 is moved in the XY direction respectively orthogonal to the Z direction and being orthogonal to each other and the stylus 5 is moved in the Z direction along the shape of the measuring object 1, the large air slide 89 is driven such that the displacement in the Z direction becomes substantially constant.

Figure 4:
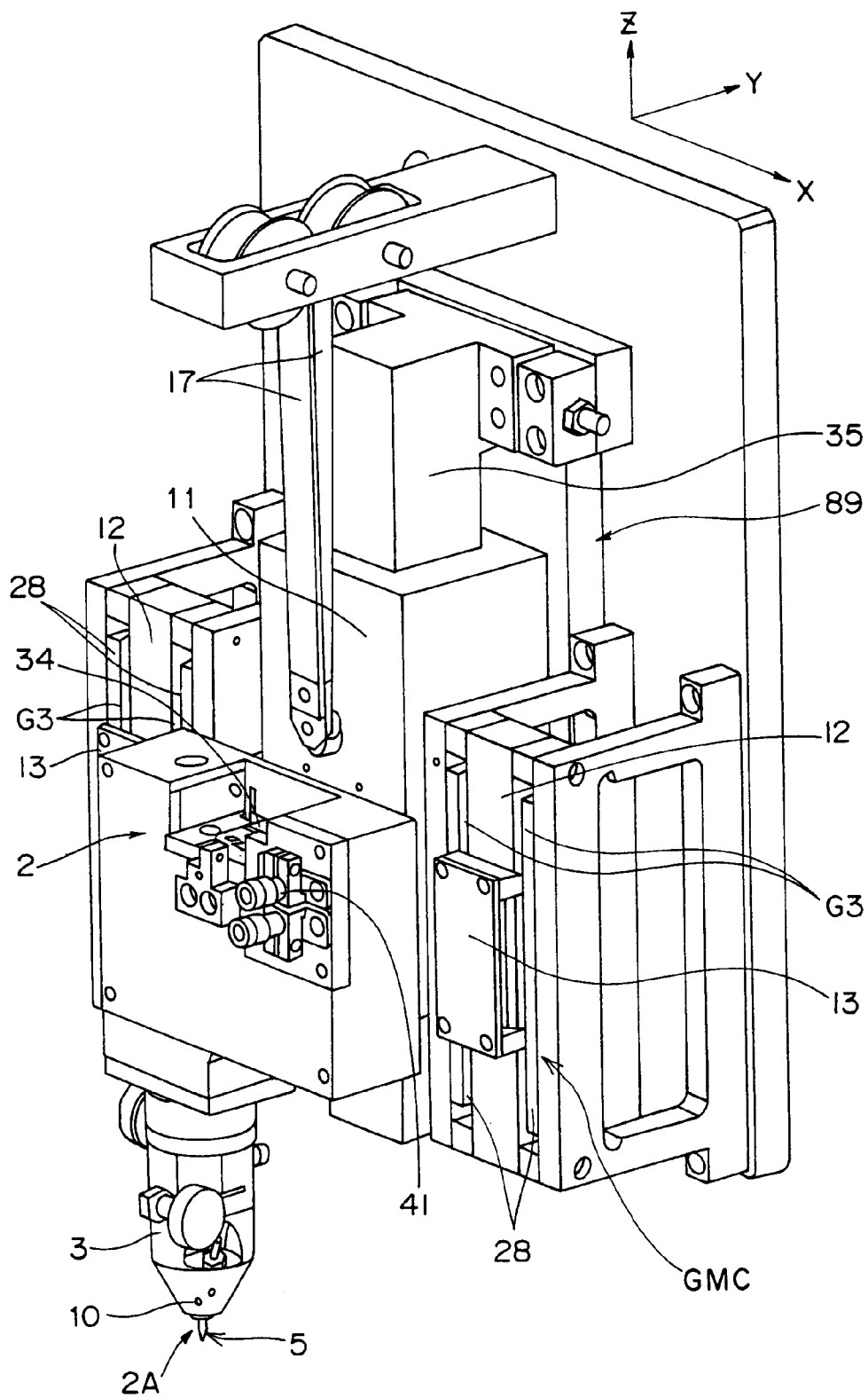
FIG. 4 is a configuration view in a Z direction of the three-dimensional measurement probe according to the embodiment of the present invention.

More specifically, as shown in FIG. 4, since currents flow the coils 13 through gaps G3 of the Z stage driving-use magnetic circuits GMC formed by large yokes (Z stage driving-use yokes) 12 and large magnets (Z stage driving-use magnets) 28 respectively fixed by brackets 86 and the like on the upper stone platen 106-side, electromagnetic force is applied on the respective coils 13 in the Z direction. The pair of right and left coils 13 connects to and becomes integral with the large air slide movable part 11 for moving the entire optical probe displacement detecting part 2 in the Z direction with extremely good straightness while being guided in the Z direction by the large air slide guide 35.

The movement straightness of the large air slide movable part 11 is directly related to the measurement precision of the ultrahigh precision three-dimensional measuring apparatus. The reason therefor will be described below. One example of the overall configuration of the ultrahigh precision three-dimensional measuring apparatus mounted with the optical probe 2A according to the present embodiment is shown in FIG. 5A.

Figure 5A:
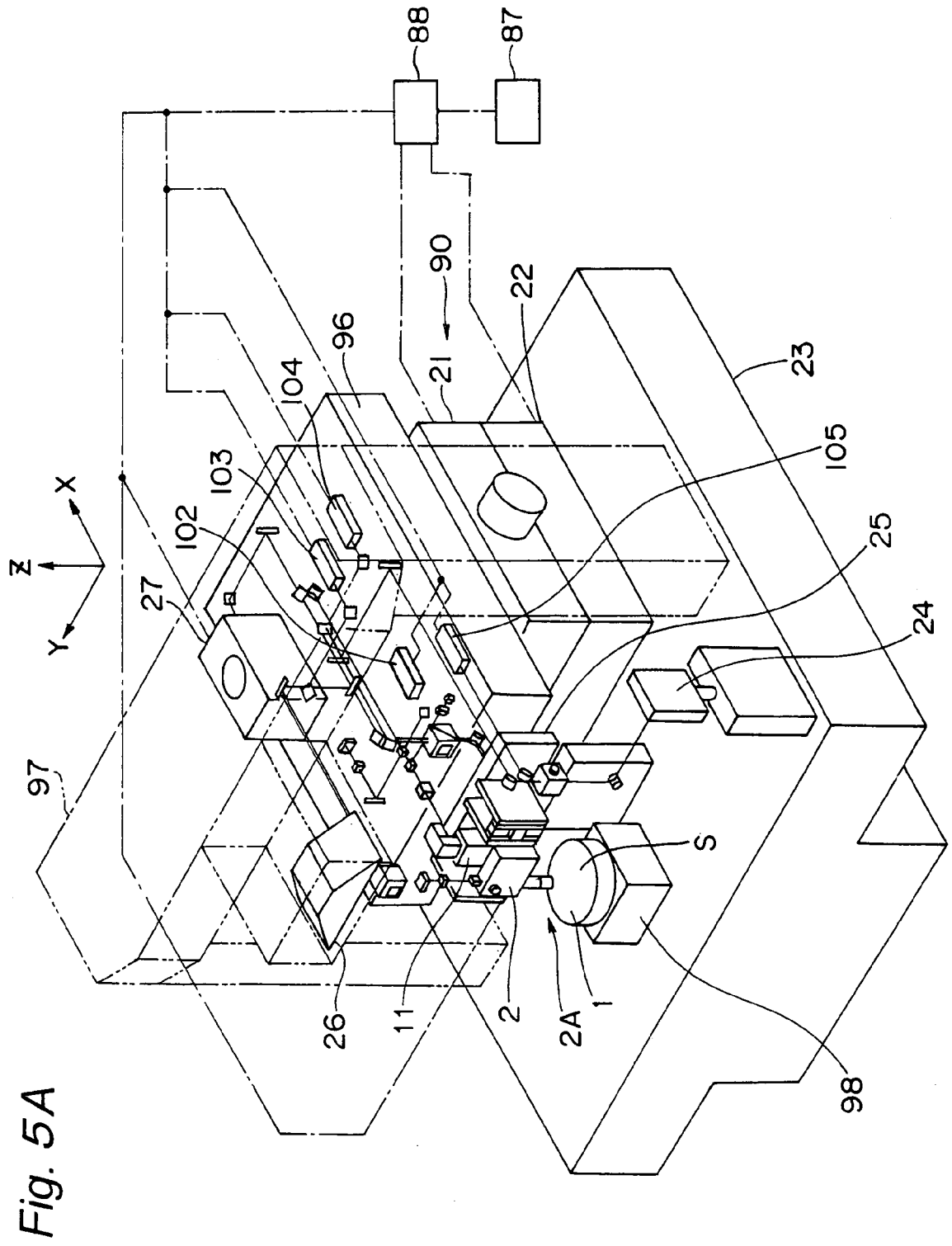
FIG. 5A is a configuration view of an ultrahigh precision three-dimensional measuring apparatus that can be attached with the three-dimensional measurement probe according to the embodiment of the present invention.

In FIG. 5A, the oscillation frequency stabilizing laser 27 serving as one example of an XYZ coordinate measurement laser beam generating device for measuring the XYZ coordinate, a length measurement unit (X direction receiver 105, a Y direction receiver 104, a $Z_1$ direction receiver 103, a $Z_2$ direction receiver 102), the large air slider movable part 11, and the optical probe displacement detecting part 2 are mounted on the upper stone platen 96. The upper stone platen 96 moves in the XY direction by an XY stage 90 functioning as one example of an XY direction moving device for moving the optical probe displacement detecting part 2 in the XY direction, that is, by the X stage 21 and the Y stage 22. On the lower stone platen 23, the object holding member 98 for mounting and holding the measuring object 1, an X reference mirror (X direction reference mirror, hereinafter simply referred to as the "X reference mirror") 24, a Y reference mirror (Y direction reference mirror, hereinafter simply referred to as the "Y reference mirror") 25, an upper Z reference mirror (Z direction reference mirror, hereinafter simply referred to as the "Z reference mirror") 26 fixed on a gate-shaped mount 97 fixed to the lower stone platen 23, are fixed respectively. In such a configuration, the displacement amounts of the distances to the three reference mirrors 24, 25, 26 of high flatness in the XYZ direction are measured by the length measurement unit on the axis of the measuring point of the measuring object 1 held by the object holding member 98 with the light of the oscillation frequency stabilizing laser 27, so that the coordinate axis precision of 10 nm order or the flatness of the reference mirrors 24, 25, 26 is obtained even if the movement straightness of the XY stage 90 (X stage 21, Y stage 22) is one micron order, but in the configuration, only the movement straightness of the air slide 89 serving as one example of the Z stage cannot be corrected with the reference mirrors 24, 25, 26.

The reason is that, although the configuration of attaching two reference mirrors of the X reference mirror and the Y reference mirror to the Z stage and correcting the movement straightness of the Z stage is disclosed in the third patent document, the reference mirror becomes heavy when attempting to obtain high flatness, and each two point must be measured when attempting to correct even the pitching (tilt) of the movement, whereby the configuration becomes extremely complicated.

The XY stage 90 is configured by the X stage 21 and the Y stage 22, and the stage is stacked in two stages, where straightness of 0.01 micron order is impossible to achieve due to the movement of center of gravity by the movement of the stage, but the movement straightness of 10 nm order can barely be achieved by devising the configuration since the air slide 89 serving as one example of the Z stage is only uniaxial and does not have movement of center of gravity. Devising the configuration includes contriving the method and configuration for supporting as well as method and configuration for driving in the Z direction in which lateral force is not applied during movement while increasing the flatness of the guide part of the Z direction large air slide guide 35 of the large air slide 89 and the lateral rigidity of the large air slide 89.

As shown in FIG. 4, the spring constant is made as small as possible and the air slide 89 is made movable in the up and down direction with small force by supporting the weight of the Z direction movable part with the constant load springs 17 formed by winding thin plates of spring material in spiral and arranged to face each other at the vicinity of the center of gravity of the Z direction movable part (large air slide movable part 11) in the air slide 89 serving as one example of the Z stage. The constant load springs 17 serves for generating tensile force substantially equal to the weight of the large air slide movable part 11 (the size of the gravity force applied to the large air slide movable part 11). The coils 13 are arranged symmetric with respect to the optical probe displacement detecting part 2, so that the combined force of the driving forces by the right and left coils 13 is applied to a position near the center of gravity of the optical probe displacement detecting part 2, whereby lowering in movement straightness by the driving force can be prevented.

Figure 5B:
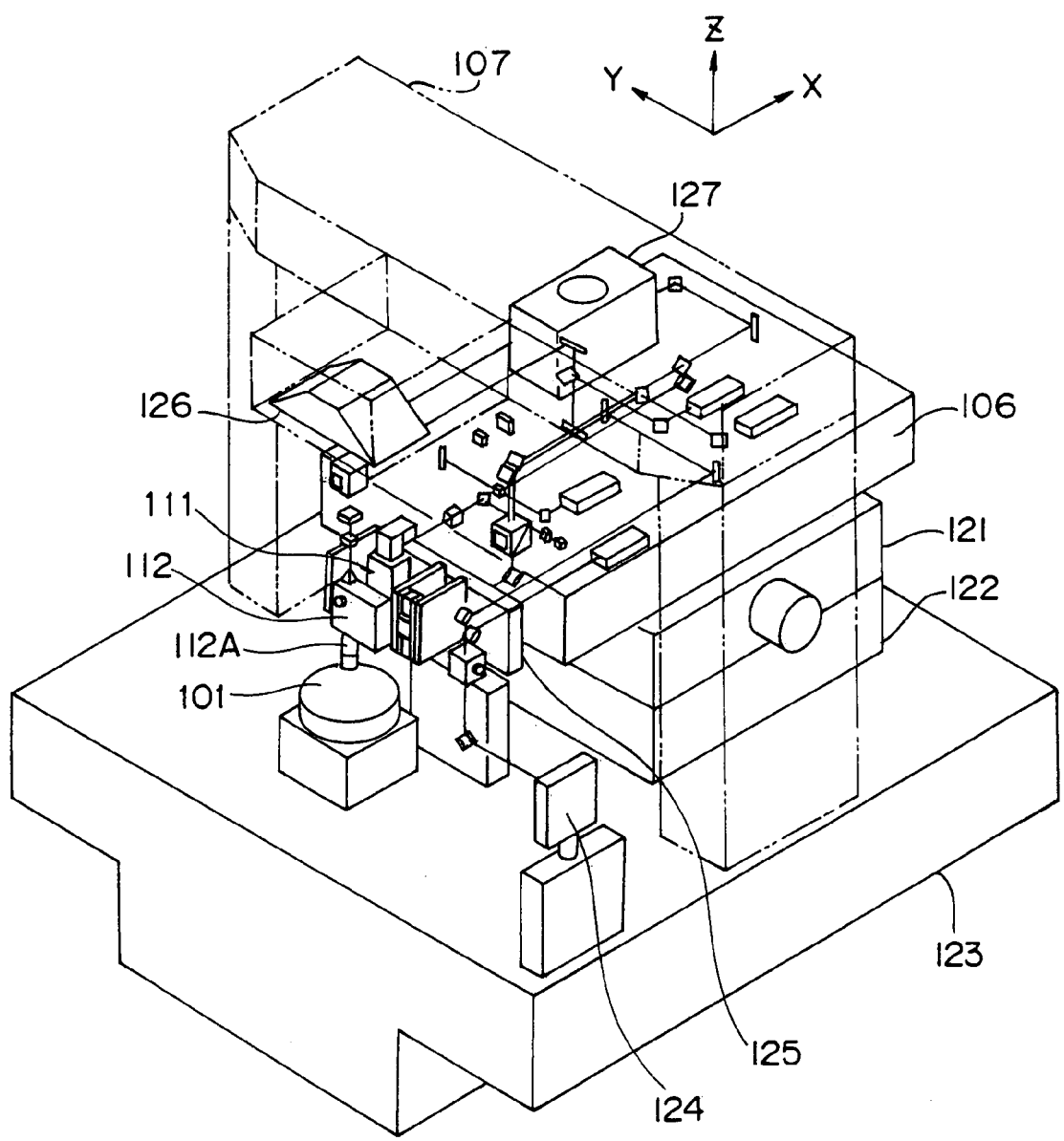
FIG. 5B is a configuration view of an ultrahigh precision three-dimensional measuring apparatus disclosed in the third patent document.

FIG. 5A illustrates a configuration of the ultrahigh precision three-dimensional measuring apparatus having a configuration similar to the configuration of the ultrahigh precision three-dimensional measuring apparatus disclosed in the third patent document. The explanatory view of the ultrahigh precision three-dimensional measuring apparatus according to the present embodiment of the present invention of FIG. 5A is obtained by substituting the optical probe displacement detecting part 2 and the probe 2 of the present embodiment including the interatomic force probe frame 3 and the like to the optical probe displacement detecting part 112A and the probe 112 of the three-dimensional measuring apparatus of FIG. 5B. That is, by way of example, the configuration in the Z direction of the ultrahigh precision three-dimensional measuring apparatus according to the present embodiment of the present invention is obtained as shown in FIG. 5A by replacing the three-dimensional measurement probe 2A shown in FIGS. 1A to 4 with the probe 112A of the three-dimensional measuring apparatus of FIG. 5B.

The measuring apparatus of the present embodiment includes a control part 88 for controlling ultrahigh precision three-dimensional measurement operation. The control part 88 is connected to the XY stage 90, that is, the driving device (not shown) of the X stage 21 and the driving device (not shown) of the Y stage 22, an He—Ne oscillation frequency stabilizing laser 27, the X direction receiver 105, the Y direction receiver 104, the $Z_1$ direction receiver 103, the $Z_2$ direction receiver 102, a computing part 87 serving as one example of a Z coordinate computing device, the Z direction driving device 43 having a focus servo mechanism, the semiconductor laser 34, the light detector 41, and the like, and performs respective operation controls thereof to control the ultrahigh precision three-dimensional measurement operation.

In FIG. 5A, the oscillation frequency stabilizing laser (oscillation frequency stabilizing HeNe laser 27) is a stabilizing laser in which the oscillation frequency is calibrated by the beat frequency measurement of an iodine stabilizing HeNe laser whose wavelength in vacuum is world length standard. The iodine stabilizing HeNe laser has an oscillation frequency of 473612214.8 MHz, and an inaccuracy of $\pm 1 \times 10^{-9}$ (3σ) (according to JIS handbook). However, as the device is complicating with an iodine absorbing cell added thereto, it cannot be mounted on the measuring apparatus. The industrially required processing precision/dimension is $10^{-4}$ to $10^{-5}$ even for high precision. That is, the normal high precision processing of a shaft having a diameter of 10 mm, for example, is performed at the diameter precision of 1 to 0.1 micron, which is a measurement limit. In the aspheric lens measurement according to the present embodiment of the present invention, the necessary inaccuracy is about $\pm 1 \times 10^{-6}$ and thus is set as an inaccurate goal of the XYZ coordinate measurement. The wavelength in air changes by $10^{-6}$ with temperature change of 1° C. or air pressure change of 3%. The measuring apparatus is used in atmosphere. Therefore, the iodine stabilizing HeNe laser does not necessarily have to be mounted on the measuring apparatus.

A compact oscillation frequency stabilizing HeNe laser 27 having an oscillation frequency of 473612.12 GHz±0.3 GHz, and an inaccuracy of $\pm 5 \times 10^{-8}$ (3σ) in which the oscillation frequency is stabilized with spectrum ray of neon or the oscillation wavelength without using the iodine absorption cell, is mounted on the measuring apparatus. Since the iodine stabilizing laser and the oscillation frequency are comparison-measured, the wavelength thereof is traceable with respect to the world length standard. The XYZ coordinate is measured with the laser beam Fz.

The laser beam Fz emitted from the oscillation frequency stabilizing laser 27 is branched into, for example, the X direction, the Y direction orthogonal to the X direction, the $Z_1$ direction orthogonal to the X direction and the Y direction, and the $Z_2$ direction orthogonal to the X direction and the Y direction, and the laser beam Fz branched into the respective directions is branched into measurement light and reference light, where the respective measurement light is irradiated on the high flatness X reference mirror 24, Y reference mirror 25, Z reference mirror 26, and Z mirror 9, the reflected light and the reference light are respectively entered into the length measurement unit, that is, the X direction receiver 105, the Y direction receiver 104, the $Z_1$ direction receiver 103, and the $Z_2$ direction receive receiver and made interfered with each other so that the XYZ coordinate can be measured with the precision of the flatness of the X reference mirror 24, the Y reference mirror 25, and the Z reference mirror 26. The Y direction is a direction orthogonal to the X direction. The $Z_1$ direction and the $Z_2$ direction respectively lie along the Z direction orthogonal to the X direction and the Y direction.

The four laser beams Fz emitted from the oscillation frequency stabilizing laser 27 are used as below. In order to form the four laser beams Fz emitted from the oscillation frequency stabilizing laser 27, four laser beam sources may be arranged, or one or four or less laser beam sources may be arranged and the laser beam(s) from the laser beam source(s) may be branched as described above to form four laser beams Fz.

The first laser beam Fz emitted from the oscillation frequency stabilizing laser 27 is irradiated on the reflecting surface (surface on the side opposite to the measuring object 1) of the X reference mirror 24, the reflected light reflected at the reflecting surface of the X reference mirror 24 is passed through the optical system, and received at an X coordinate measurement unit (X coordinate laser length measuring unit, that is, X direction receiver) 105 serving as one example of the X coordinate measuring device, and the X coordinate of the optical probe displacement detecting part 2 is measured by the X direction receiver 105 based on the received laser beam. Since the X reference mirror 24 is assumed to be totally planar, measuring the X coordinate of the X reference mirror 24 means measuring the displacement amount of the distance between the optical system fixed to the upper stone platen 96 and the reflecting surface of the X reference mirror 24.

Similarly, the second laser beam Fz emitted from the oscillation frequency stabilizing laser 27 is irradiated on the Y reference mirror 25, the reflected light reflected at the Y reference mirror 25 is received by a Y coordinate measurement unit (Y coordinate laser length measuring unit, that is, Y direction receiver) 104 serving as one example of the Y coordinate measuring device, and the Y coordinate of the optical probe displacement detecting part 2 is measured by the Y direction receiver 104 based on the received laser beam. Since the Y reference mirror 25 is assumed to be totally planar, measuring the Y coordinate means measuring the displacement amount of the distance between the mirror (not shown) fixed to the upper stone platen 96 and the reflecting surface of the Y reference mirror 25.

The third laser beam Fz emitted from the oscillation frequency stabilizing laser 27 is irradiated on the Z mirror 9, and the reflected light reflected at the Z mirror 9 is received by a $Z_2$ coordinate measurement unit ($Z_2$ coordinate laser length measuring unit, that is, $Z_2$ direction receiver) 102 serving as one example of the $Z_2$ coordinate measuring device (Z coordinate measuring part), and the $Z_2$ coordinate of the Z mirror 9 is measured by the $Z_2$ direction receiver 102 based on the received laser beam. Measuring the $Z_2$ coordinate means measuring the displacement amount of the distance from the reflecting surface of a reflective mirror (not shown) fixed to the upper stone platen 96 for reflecting the third laser beam Fz so as to enter the Z mirror 9 to the reflecting surface of the Z mirror 9.

The fourth laser beam Fz emitted from the oscillation frequency stabilizing laser 27 is reflected by a mirror fixed to the upper stone platen 96 and then, the reflected light reflected by the reflecting surface or the lower surface of the Z reference mirror 26 is received by a $Z_1$ coordinate measurement unit ($Z_1$ coordinate laser length measuring unit, that is, $Z_1$ direction receiver) 103 serving as one example of the $Z_1$ coordinate measuring device, and the $Z_1$ coordinate of the optical probe displacement detecting part 2 is measured by the $Z_1$ direction receiver 103 based on the received laser beam. Measuring the $Z_1$ coordinate means measuring the displacement amount of the distance from the reflecting surface of the mirror fixed to the upper stone platen 96 for reflecting the fourth laser beam Fz so as to enter the reflecting surface of the Z reference mirror 26 to the reflecting surface of the Z reference mirror 26.

That is, regarding the Z coordinate, the laser beam Fz of FIGS. 3A and 3B is measured and obtained as below with the third and fourth laser beams Fz from the oscillation frequency stabilizing laser 27. The $Z_2$ coordinate is measured by the $Z_2$ direction receiver 102 with the laser beam Fz totally transmitted through the dichroic mirror 15 from the optical system of the length measurement unit on the upper stone platen 96 of FIG. 5A, narrowed by the lens 14, and reflected by the mirror 9. The movement straightness of the XY stage 90 has an order of one micron, but the laser beam Fz is irradiated on the Z reference mirror 26 having a flatness of 10 nanometer order from the optical system of the length measurement unit on the upper stone platen 96, and the $Z_1$ coordinate is measured by the $Z_1$ direction receiver 103 from the reflected light of the Z reference mirror 26. The ($Z_1$ coordinate+$Z_2$ coordinate) are computed in the computing part 87 to obtain the Z coordinate, and the Z coordinate can be measured with the precision of the Z reference mirror 26.

Before the start of measurement of the three-dimensional shape of the measuring object 1, the upper and lower styluses 5 of the measuring object 1 are distant from the measuring surface S of the measuring object 1, and thus the focus servo described above cannot be applied. A Z direction position detector (not shown) is attached to the optical probe displacement detecting part 2, and the optical probe displacement detecting part 2 is moved in the Z direction by the Z direction driving device 43 under the control of the control part 88 so that the position signal from the position detector becomes a position command value that changes by a manually driven dial 91 attached to an operation part of the measuring apparatus and turned by a worker (in other words, the Z direction driving device 43 is driven based on input information produced by turning the manually driven dial 91 by the worker, and the distal end of the optical probe displacement detecting part 2 is moved to a position close to the measuring surface S of the measuring object 1 by less than or equal to 5 mm). This is referred to as "position servo".

When position servo is applied, the measuring force is not applied to the stylus 5, and thus the lens 14 is position-adjusted in the Z direction in advance with respect to the probe casing 2a so that the mirror 9 is at a position distant from the focus position by about 10 microns.

At the start of measurement, the measuring object 1 is placed at a position of a few millimeters immediately below the stylus 5, and the worker pushes a focus start button at the operation part of the measuring apparatus to release the manual drive based on the manually driven dial 91 to switch to automatic control. The optical probe displacement detecting part 2 is then moved to gradually approach the measuring surface S toward the measuring surface S by the Z direction driving device 43. When the stylus 5 detects the measuring surface S of the measuring object 1 (when the stylus 5 touches the measuring surface S of the measuring object 1), the mirror 9 moves in the focus direction of the semiconductor laser beam $F_L$ by the measuring force of the stylus 5, and thus when the focus error signal detecting part 42 detects that the mirror 9 has moved in the focus direction of the semiconductor laser beam $F_L$ by change in the focus error signal (in other words, when the mirror 9 reaches the vicinity of the focal position), the position servo is switched to the focus servo, and the mirror 9 arrives at the focal position. In other words, the optical probe displacement detecting part 2 is moved by the Z direction driving device 43 until the focus error signal becomes zero. This is the state in which the focus servo is applied.

The semiconductor laser beam $F_L$ is fully entered through the opening of the lens 14, as shown in FIGS. 3A and 3B, to detect the focus error signal at satisfactory sensitivity, but the Z coordinate measurement HeNe stabilizing laser beam Fz is entered with the light flux diameter smaller than the opening of the lens 14, and thus the focal depth is deep and the Z coordinate can be sufficiently measured from the reflected light even if the Z mirror 9 is at a position off the focal position by about 10 microns.

Figure 7:
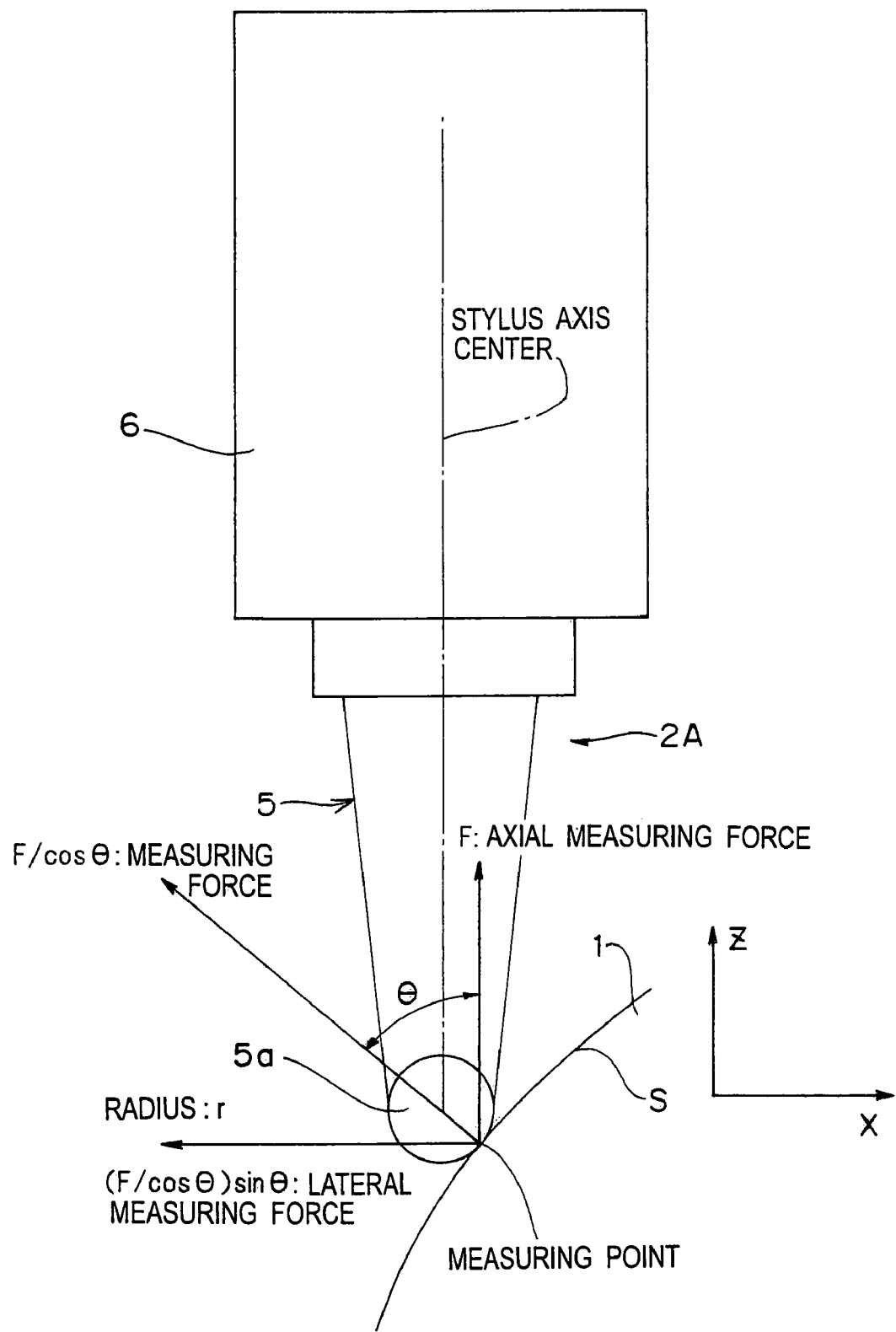
FIG. 7 is an explanatory view relating to the measuring force of the three-dimensional measurement probe according to the embodiment of the present invention.

The setting of the measuring force and the reasons thereof will now be described. The measuring force acting in the axial direction of the stylus 5 shown in FIG. 7 is assumed as F. Since the mirror 9 moves to the focal position by the measuring force F, the measuring force F becomes constant irrespective of the tilt of the measuring surface S. The measuring force F can be set by moving the lens 14 of FIGS. 3A and 3B upward and downward.

The measuring force acting in the direction vertical to the measuring surface S is F/cos θ. θ is the angle of inclination of the measuring surface S. As shown in FIG. 7, the lateral measuring force of (F/cos θ)sin θ acts on the stylus. The lateral measuring force is 1.7 times F when θ is 60 degrees, and 3.7 times F when θ is 75 degrees.

When the stylus 5 tilts to the side by the lateral measuring force, a measurement error occurs. In order to make the measurement error as small as possible, the measuring force is desirably made as small as possible. The smaller the measuring force is, the smaller the tilt of the stylus 5 is, whereby the measurement error becomes smaller.

The smaller the measuring force is, the smaller the wear of the stylus 5 is, and thus the stylus 5 lasts for a long time.

Furthermore, when measuring a soft surface made of resin or the like with a pointed stylus having a distal end radius of 2 microns, the measurement error caused by damages on the measuring surface S or deformation of the measuring surface may occur. In this case also, the smaller measuring force is preferable. Based on empirical data, the measuring force at which scratches and errors are not as noticeable is less than or equal to 0.2 mN. When measurement is performed with the stylus having a distal end radius of 0.5 mm, there has been no case where the soft surface is damaged.

When measurement is performed with the stylus of the distal end radius of 0.5 mm, dust on the surface might get measured if the measuring force is small. If the measuring force is large, dust is not measured but pushed aside. In this regards, measurement is more easily carried out with large measuring force.

The probe having a small distal end radius is less likely to measure dust, but it is difficult to form the distal end to have a satisfactory sphericity. Measurement precision lowers if the sphericity of the distal end is not satisfactory. The sphericity can be measured in advance and corrected from data, but this is troublesome.

If the movable part mass is the same, the response becomes faster as the measuring force becomes larger, and thus measurement can be rapidly performed.

Therefore, optimum measuring force exists on the basis of the current technical level; it is 0.1 mN to 0.3 mN. The measuring force is thus set as the center value 0.2 mN, and is adjustable in the range of 0.1 mN to 0.3 mN by adjusting the position of the lens 14.

The small slidably moving shaft part 6 is designed to be moved about 10 microns with respect to the small air bearing 7 with the measuring force of 0.2 mN from the position lowered by about 100 microns by its own weight. The probe 2A can be arranged laterally, in which case the movement by its own weight does not occur, but is designed to be moved about 10 microns from the balanced position with the measuring force of 0.2 mN.

The reason for applying the focus servo at the position where the small slidably moving shaft part 6 is moved by about 10 microns with the measuring force of 0.2 mN will be described below.

The measuring force 0.2 mN is 0.2 grams by weight with respect to the mass of the small slidably moving shaft part 6 of about 0.2 g which includes the stylus 5, and thus the focus servo is applied at the position where the small slidably moving shaft part 6 is moved by about 10 micros with the force of one tenth of the weight of the small slidably moving shaft part 6.

Since the displacement amount of the distance to the mirror 9 is measured by interference with the oscillation frequency stabilizing HeNe laser beam Fz even when an error is produced in the focus servo, the measurement error does not occur and only fluctuation in the measuring force occurs.

As shown in FIGS. 3A and 3B, the semiconductor laser beam $F_L$ is fully entered through the opening of the lens 14 such that the focus sensitivity is satisfactory, and thus the focus servo can be applied with the numerical aperture (NA) of about 0.4 and the fluctuation in the displacement amount of the distance of the lens 14 and the mirror 9 of less than or equal to 1 micron. That is, when moving the measuring object 1 or the large air slide 89 by the XY stage 90 in the XY direction respectively orthogonal to the Z direction and being orthogonal to each other, and moving the stylus 5 in the Z direction along the shape of the measuring object 1, the focus servo is applied such that the displacement in the Z direction becomes substantially constant to drive the large air slide 89 by the Z direction driving device 43. At that time, the change in the measuring force is less than or equal to 0.02 , mN.

The semiconductor laser beam $F_L$ having a light flux diameter of 1 to 2 mm is entered into the lens 14 as it is such that the oscillation frequency stabilizing HeNe laser beam Fz has a deep focus depth. The focus depth becomes about 20 microns and the position of the mirror 9 is shifted by 10 microns when the stylus 5 is not contacting the measuring surface S of the measuring object 1, but laser length measurement becomes possible without any problem.

Unless the Z coordinate can be measured even when the stylus 5 is not contacting the measuring surface S, the Z coordinate will not be saved when measuring a plurality of measuring objects 1 that cannot be measured through continuous scanning, and thus is very inconvenient. For instance, when designing the magnetic force to a weak elastic coefficient such that the small slidably moving shaft part 6 moves 20 microns with the measuring force of 0.2 mN, for example, the position of the mirror 9 shifts by 20 microns when the stylus 5 moves away from the measuring surface S and deviates from the focal depth of the length measuring HeNe laser beam Fz, whereby the length measurement becomes unstable.

When setting the magnetic force to a strong elastic coefficient such that the small slidably moving shaft part 6 moves 5 microns with the measuring force of 0.2 mN, for example, the change in the measuring force becomes large even if the focus servo is applied with the change in the displacement amount of the distance of the lens 1 and the mirror 9 of less than or equal to 1 micron, and when adjusting the position of the lens 9 such that he measuring force becomes 0.1 mN, the small slidably moving shaft part 6 moves only 2.5 microns, whereby the servo becomes unstable.

These are the reasons for designing such that the small slidably moving shaft part 6 moves about 10 microns with the measuring force of 0.2 mN.

The required torque of the force for preventing the movement in the rotating direction with the Z direction (axial direction of the small slidably moving shaft part 6) of the small slidably moving shaft part 6 at the center will now be described. Since the stylus distal end sphere 5a which is a part of the stylus 5 is eccentrically attached within an assembly tolerable range with respect to the axis center of the micro-air slide, measurement value changes when the stylus distal end sphere 5a rotates with the axis of the small slidably moving shaft part 6 at the center, whereby a measurement error is produced.

The force for preventing rotation is preferably the stronger the better, but if the magnetic pin 20 is made large therefor, the mass of the small slidably moving shaft part 6 becomes large. Since the mass of the small slidably moving shaft part 6 is smaller the better due to the above reasons, the weight of the magnetic pin 20 is desirably made to the requisite minimum. In the present embodiment of the present invention, according to the configuration of FIGS. 1A and 1B, the magnetic pin 20 has a thickness of 0.5 mm and is ultralight or has a mass of 16 milligrams by way of example. The magnetic force in the rotating direction of Tm=274 mN·mm/rad is realized. That is, rotation of only 1 mrad is obtained at the torque Tm=0.27 mN·mm/rad.

Review was made on the possible maximum measurement error by the amount of rotation of the stylus 5 in the actual measurement with the configuration of FIGS. 1A and 1B.

Figure 6A:
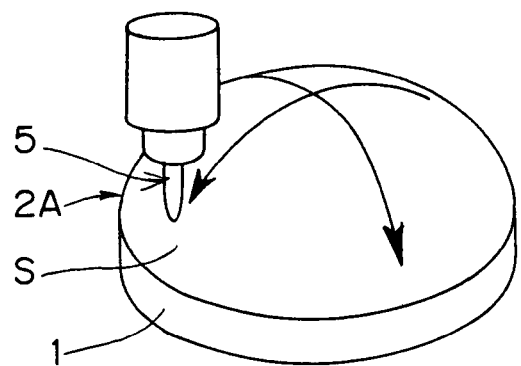
FIG. 6A is an explanatory view showing a measurement path of the three-dimensional measurement probe according to the embodiment of the present invention.
Figure 6B:
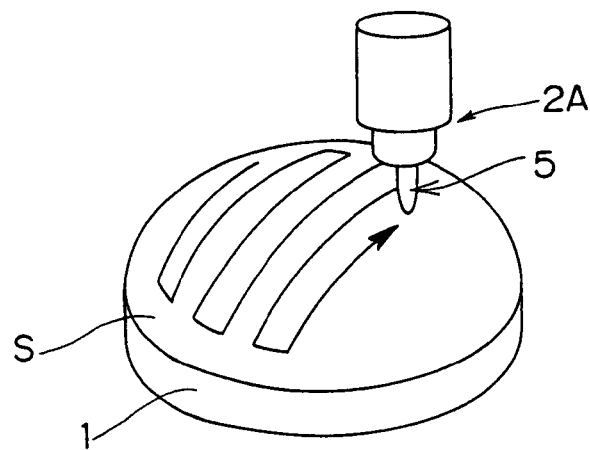
FIG. 6B is an explanatory view showing a measurement path of the three-dimensional measurement probe according to the embodiment of the present invention.
Figure 6C:
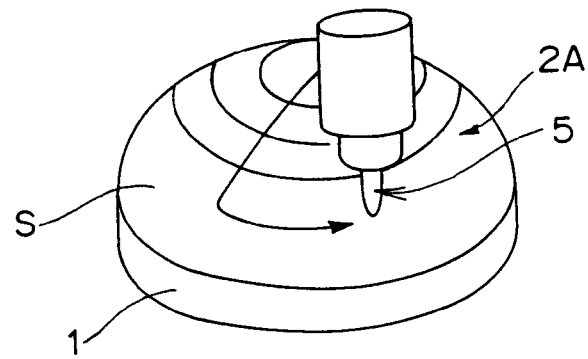
FIG. 6C is an explanatory view showing a measurement path of the three-dimensional measurement probe according to the embodiment of the present invention.

FIGS. 6A to 6C show a scanning method in the case of measuring the surface S of a lens serving as one example of the measuring object 1 with the stylus 5. The measurement with the stylus 5 of the line passing through the center of the lens 1 at the surface S of the lens 1 as in FIG. 6A is referred to as "on-axis measurement", the scanning of the entire surface S of the lens 1 as in FIG. 6B is referred to as "on-surface measurement", and concentric scanning of the surface S of the lens 1 as in FIG. 6C is referred to as "circumferential measurement". The lens 1 may not be rotation symmetric, and the present embodiment according to the present invention is not limited to the rotation symmetric lens, but analysis of rotary torque applied on the stylus 5 can be performed therewith.

The rotary torque applied on the stylus 5 is generated by the measuring force of the stylus 5 on the surface S of the lens 1. When axial measuring force F is applied to the stylus distal end sphere 5a of radius r as in FIG. 7, the measuring force of $F/\cos\theta$ is applied in the direction perpendicular to the measuring surface S and $(F/\cos\theta)\sin\theta$ in the lateral direction.

Figure 8:
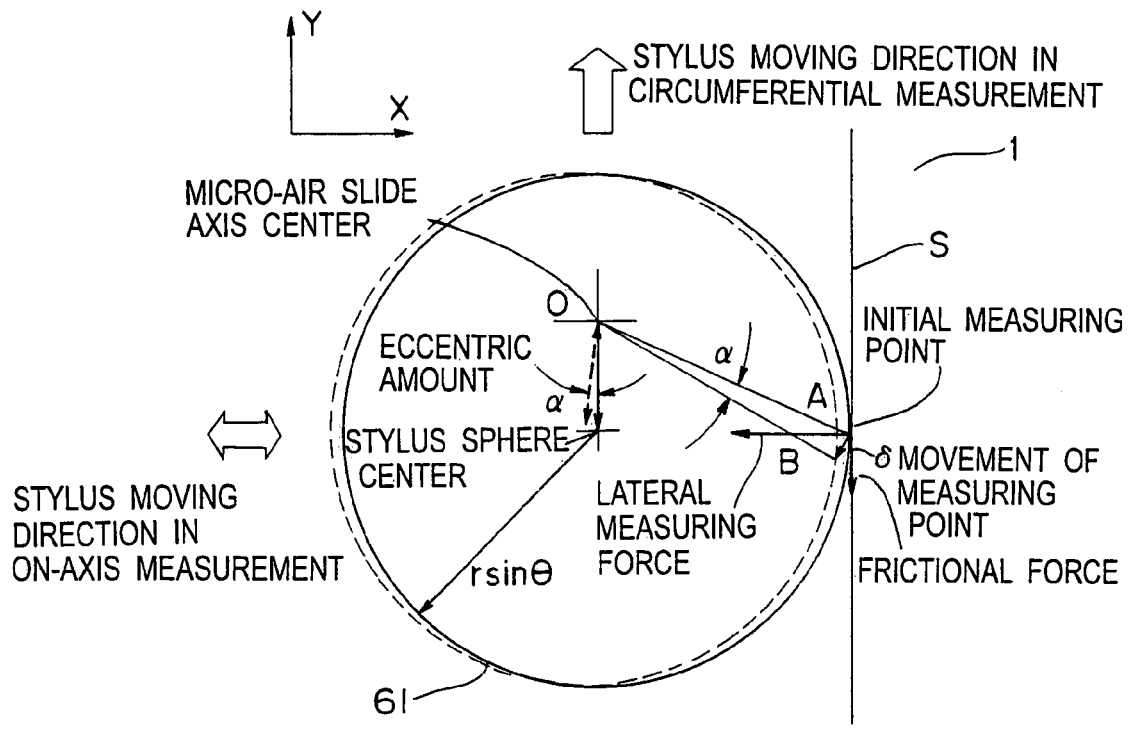
FIG. 8 is an explanatory view showing a state where a stylus rotation error is produced by the measuring force.
Figure 9:
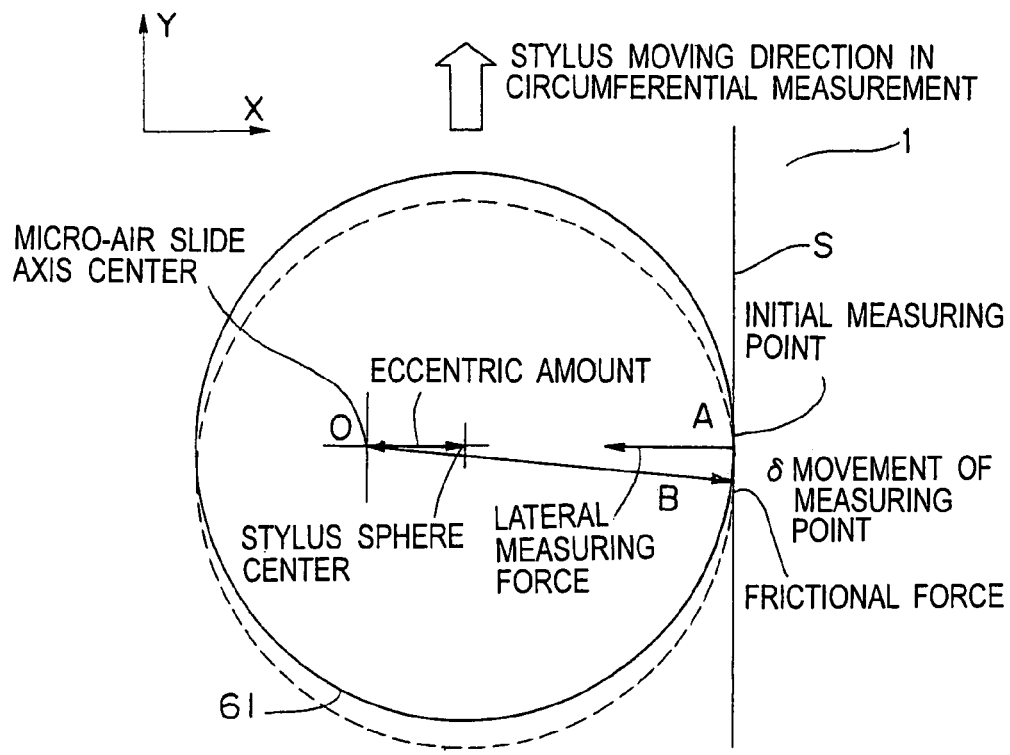
FIG. 9 is an explanatory view showing a state where a stylus rotation error is not produced by the measuring force.
Figure 10:
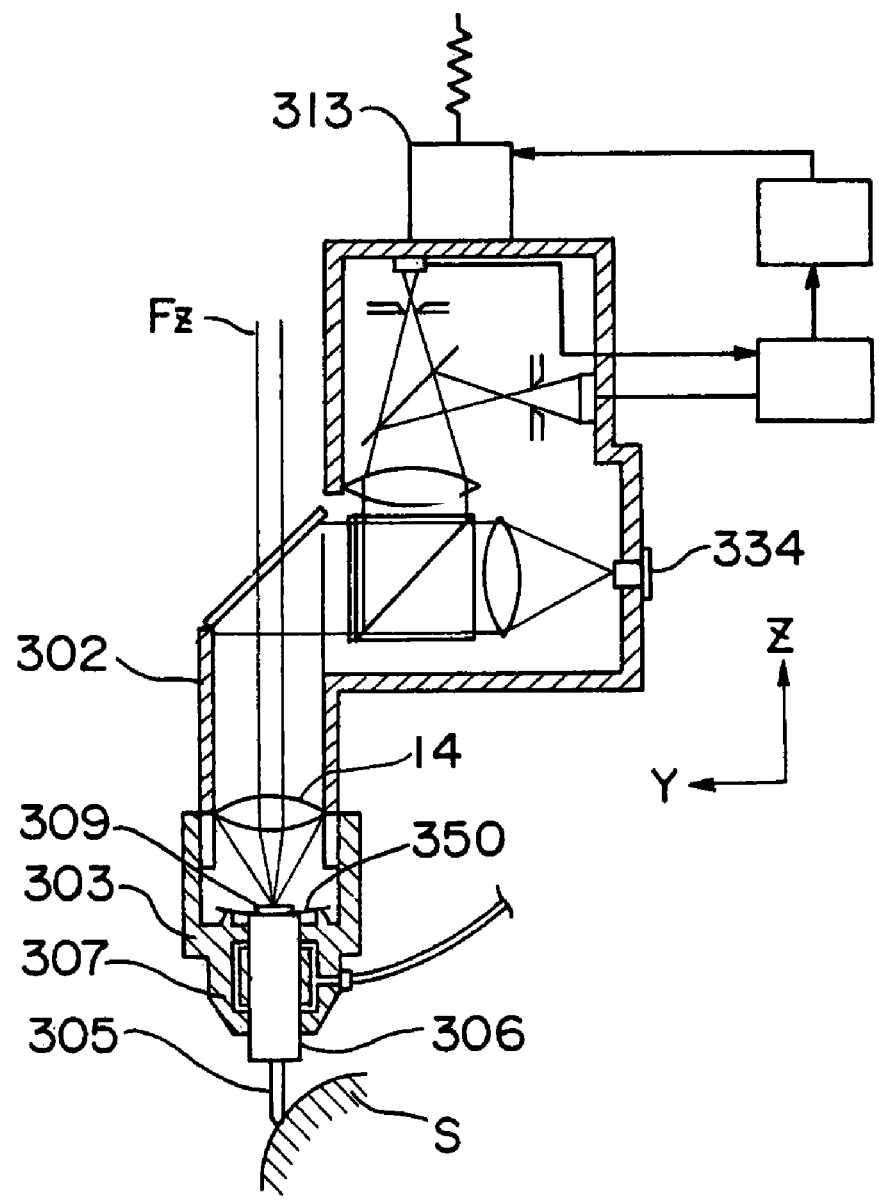
FIG. 10 is a configuration view of a conventional three-dimensional measurement probe disclosed in the first patent document.

FIG. 8 shows the cross section at the height where the stylus distal end sphere 5a contacts the measuring surface S in FIG. 7 when seen from above. To simplify the description, the cross section hatching in FIGS. 8 and 9 is omitted. Therefore, the radius of the circle of FIG. 8 becomes $r\sin\theta$ with respect to the radius r of the stylus distal end sphere 5a. When the axis center of the micro-air slide is shifted in the direction parallel to the measuring surface S, the maximum measurement error is produced. FIG. 8 shows such a state. When the axis center of the micro-air slide is at a position most distant from the measuring point as in FIG. 9, the maximum rotary torque acts on the stylus 5 in the circumferential measurement, but the measurement value barely changes even if the stylus distal end sphere 5a moves to the broken line position of FIG. 9. That is, a measurement error does not occur.

In the on-axis measurement, the stylus 5 moves only in the left and right direction of FIG. 8, and thus there is no friction in the up and down direction in the page space of FIG. 8, and the rotary torque becomes (Eq. 2)

On-axis measurement rotary torque $T$=eccentric amount×lateral measuring force (2)

When scanning and measuring the edge of the stylus distal end sphere 5a in the non-tilted direction in the circumferential measurement and the on-surface measurement, frictional force is applied in addition to the measuring force, and thus (Eq. 3)

Circumferential measurement rotary torque $T$=eccentric amount×lateral measuring force+$r$ sin θ×measuring force×friction coefficient (3)

The magnetic force for stopping the rotation rotates only by 1 mrad with the torque of Tm, as described above, and thus the rotation angle is T/Tm(mrad) and the lateral measurement error E to be obtained is the rotation angle×eccentric amount, and thus (Eq. 4)

$E$=eccentric amount×$T/Tm$ (4)

With the eccentric amount 0.1 mm, F=0.3 mN, the lateral measuring force $(F/\cos\theta)\sin\theta$, r=0.5 mm, the measuring force $F/\cos\theta$, and the friction coefficient 0.5, as described above, Tm=0.27 mN·mm/mrad, and the lateral measurement error is calculated in two cases of θ being 60 degrees and 75 degrees.

The calculation result is summarized as in table 1.

TABLE 1

|  | 60 DEGREES | 75 DEGREES |
| --- | --- | --- |
| ON-AXIS MEASUREMENT | 0.02 MICRONS | 0.04 MICRONS |
| CIRCUMFERENTIAL MEASUREMENT | 0.07 MICRONS | 0.14 MICRONS |

The on-axis measurement up to the angle of inclination of 60 degrees is the general measurement, and the error in this case is less than or equal to 0.2 microns, or an ultrahigh precision measurable level. If the measuring force is 0.2 mN, the maximum measurement error decreases by ⅔ times, and if the eccentricity of the stylus 5 is suppressed to less than or equal to 0.05 mm, the maximum error is further reduced to half, in which case even a level enabling ultrahigh precision measurement of the lateral error within 0.05 microns is reached even in the circumferential measurement of 75 degrees.

A ruby sphere having a diameter of 1 mm of satisfactory sphericity, diamond processed to a spherical surface having a distal end radius of 2 microns, or the like is attached to the stylus distal end sphere 5a. For instance, the ruby sphere having a diameter of 1 mm is used when measuring the lens 1, whereas diamond is used when measuring the surface of the measuring object 1 that is microscopically processed into, e.g., diffraction grating, and thus the stylus 5 needs to be replaced.

Figure 11:
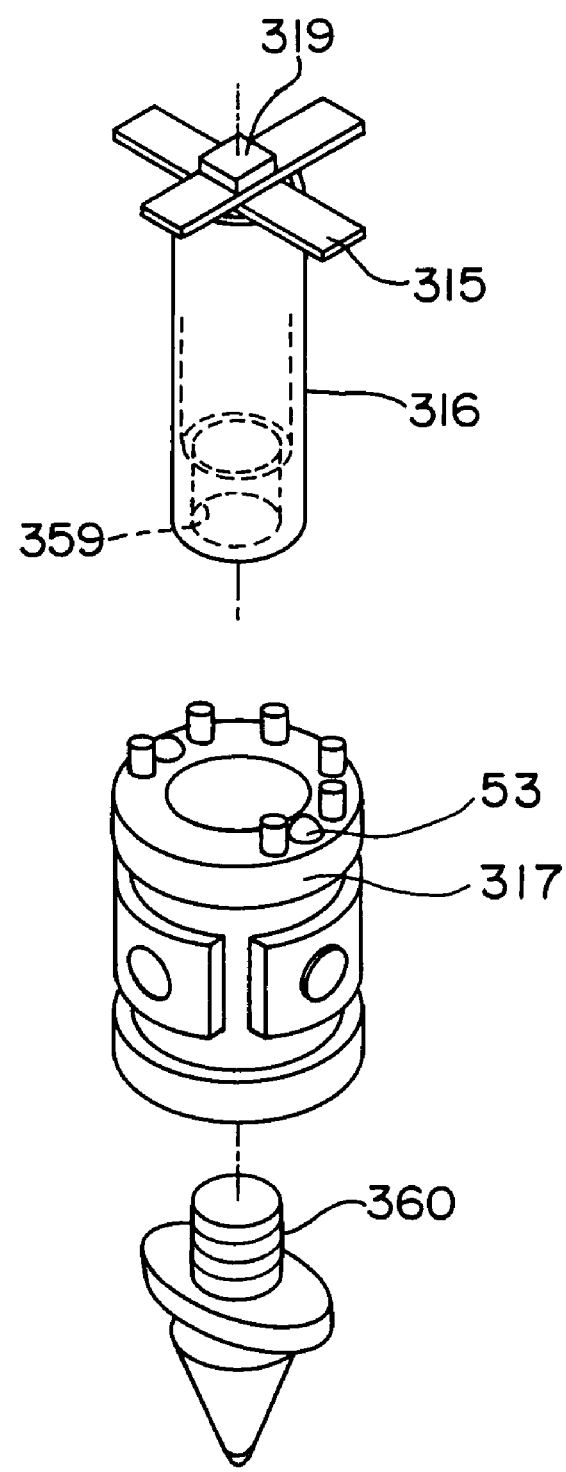
FIG. 11 is a configuration view of a conventional three-dimensional measurement probe disclosed in the second patent document.
Figure 12:
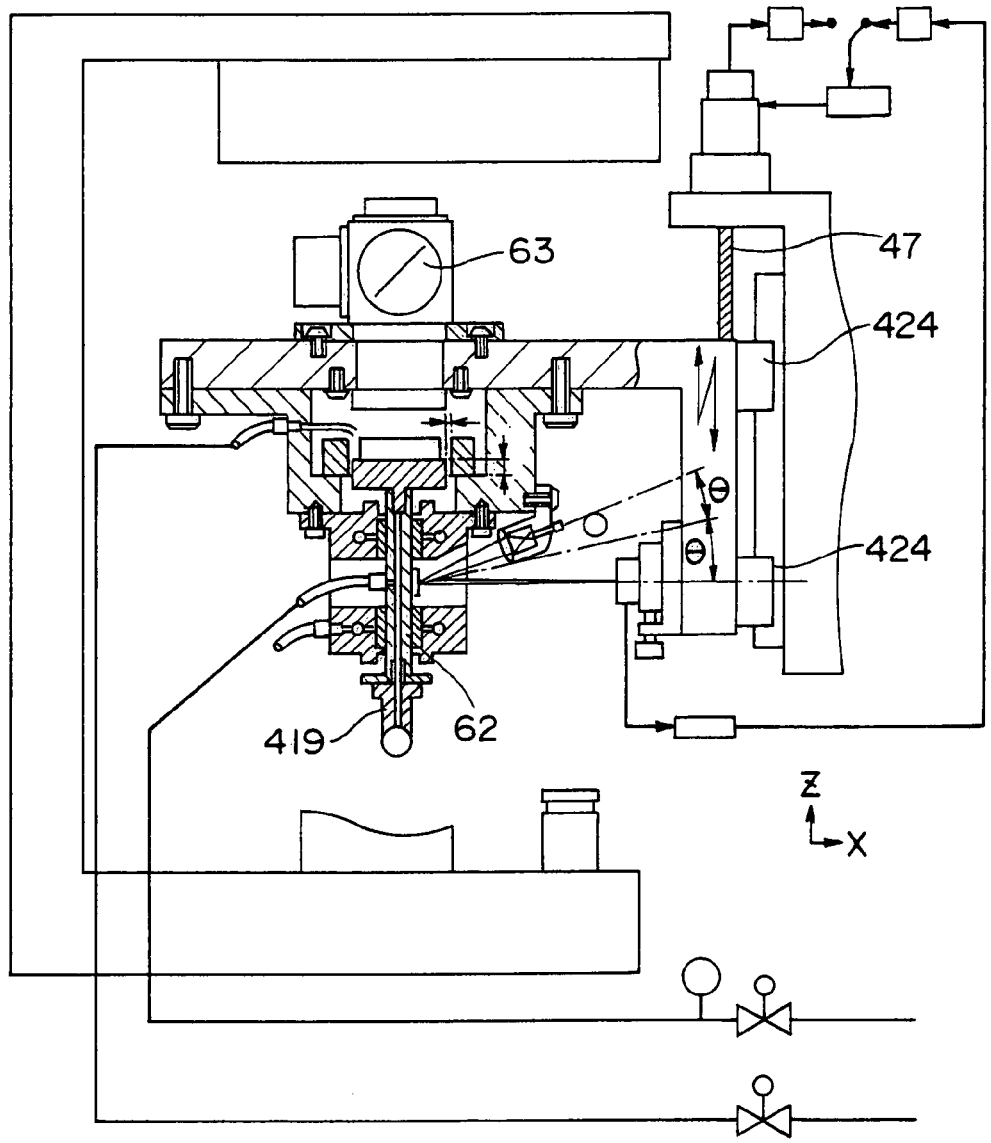
FIG. 12 is a configuration view of a conventional contact probe disclosed in the fourth patent document.
Figure 13:
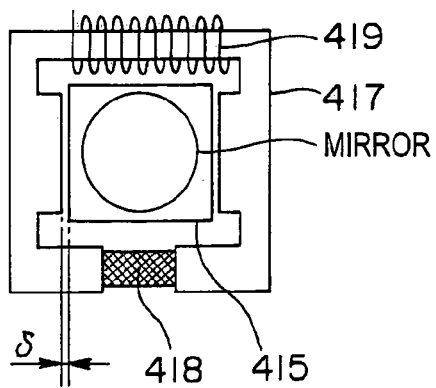
FIG. 13 is an explanatory view of a main part of the conventional contact probe disclosed in the fourth patent document.
Figure 14B:
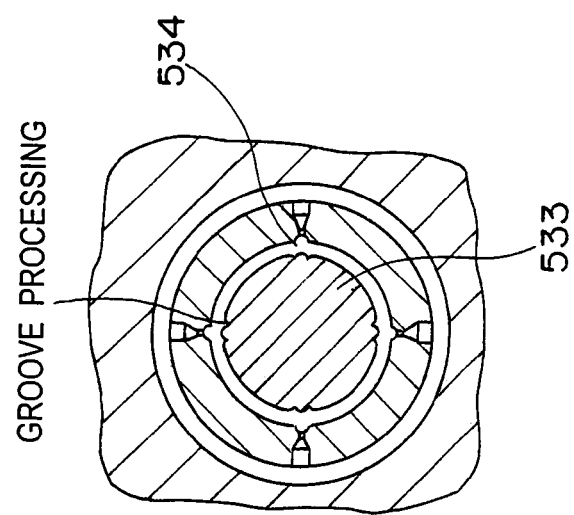
FIG. 14B is a configuration view of the conventional hydrostatic bearing device and the displacement measuring device disclosed in the fifth patent document.
Figure 14A:
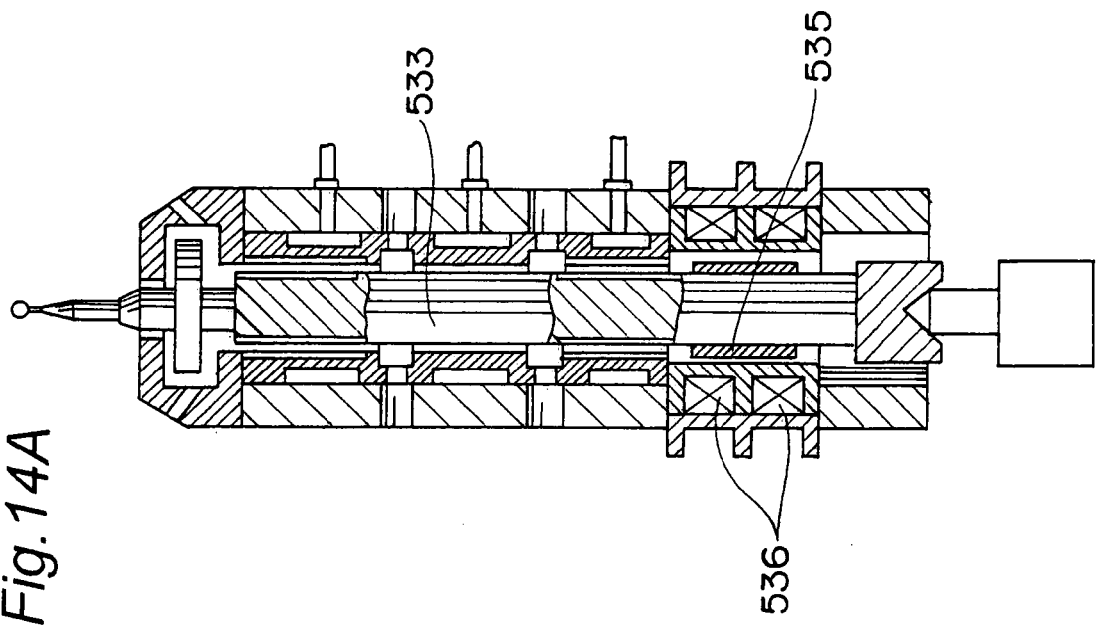
FIG. 14A is a configuration view of a conventional hydrostatic bearing device and a displacement measuring device disclosed in the fifth patent document.

Regarding the replacement of the stylus 5, the stylus 5 can be removably attached by tightening a screw 360 provided at the stylus 5 to an internal thread 359 processed into the small slidably moving shaft part 6, and thus is replaceable, as shown in FIG. 11, similarly to the second patent document. In screw-tightening and -detaching, the stylus 5 needs to be rotated after being pressed against the small slidably moving shaft part 6.

In FIGS. 1A, 1B, and 2A, a non-magnetic stopper 30 is attached to an end face (end face on the side where the magnetic pin 20 is arranged) on the basal end side of the small slidably moving shaft part 6, and in a case where the stylus 5 is pressed against the small slidably moving shaft part 6, the stopper 30 contacts an annular contacting part 36 fixed to the interatomic force probe frame 3, and in a case of turning the screw (see screw 360 of FIG. 11) of the stylus 5, the stopper 30 contacts a rotation stopping pin 31 fixed to the end face on the basal end side of the small slidably moving shaft part 6 thereby stopping the rotation of the small slidably moving shaft part 6. In other words, it is configured such that the non-magnetic stopper 30 stops the excessive movement of the small slidably moving shaft part 6 in the case where the force exceeding the magnetic force that prevents the movement of the small slidably moving shaft part 6 in the Z direction with respect to the small air bearing part 7A and in the rotating direction with the Z direction as the axis is applied in the Z direction of the small slidably moving shaft part 6 or in the rotating direction with the Z direction as the axis. Thus, only the stylus 5 is rotatable with respect to the small slidably moving shaft part 6, and the screw 360 provided on the stylus 5 can be removed from the internal thread 359 by being rotated with respect to the internal thread 359 processed on the small slidably moving shaft part 6. When attaching another stylus 5 to the small slidably moving shaft part 6, the screw 360 provided on the stylus 5 is inserted into the internal thread 359 processed on the small slidably moving shaft part 6 and rotated to screw the screw 360 into the internal thread 359 with the stylus 5 pressed against the small slidably moving shaft part 6 and the stopper 30 contacted to the rotation stopping pin 31 and stopping the rotation of the small slidably moving shaft part 6. In normal measurement, the stopper 30 and the contacting part 36, as well as the stopper 30 and the rotation stopping pin 31 are respectively sufficiently spaced apart and do not contact each other, and thus do not affect the measurement in any way.

In the present embodiment, a ring-shaped yoke 8a is used. This is superior but the yoke need not necessarily be in a ring-shape and can still be used even if one of the rings is missing.

In the present embodiment, the shape of a portion near the gap of the magnetic pin 20 and the yokes 8b-1, 8b-2 is in a tapered shape that is thick in the axial direction and thin in the rotating direction. This is superior, but they need not necessarily be in a tapered shape, and can still be used even if in a circular cone shape or a pyramid shape.

Furthermore, in the present embodiment, the displacement amount with respect to the optical probe displacement detecting part 2 in the Z direction of the small slidably moving shaft part 6 is detected with the semiconductor laser beam Fz. Other methods include detecting the displacement with a triangular distance measuring method using an electrostatic capacity sensor and light of a light emitting diode.

In the present embodiment, the oscillation frequency stabilizing laser beam Fz is irradiated on the mirror 9, and the Z coordinate of the mirror 9 is measured from the reflected light. This is superior, but the present invention is not limited thereto, and the Z coordinate may be measured in linear scale.

Furthermore, in the present embodiment, rotation stopping with respect to the small slidably moving shaft part 6 of the stylus 5 is performed using the rotation stopping stopper 30 and the rotation stopping pin 31. In this case, the stylus 5 is screwed into the small slidably moving shaft part 6, but the present invention is not limited thereto, and a spring may be attached to the stylus 5 or the hole of the small slidably moving shaft part 6 to enable insertion and fixation, or the small slidably moving shaft part 6 and the stylus 5 may be integrally processed, in which case the rotation stopping stopper and the rotation stopping pin are not necessary.

In the present embodiment, the Z stage is configured only by the large air slide 89, that is, the air bearing configured by the Z direction large air slide guide 35 and the large air slide movable part 11. However, the Z stage is not limited thereto, and may be configured by a roller guide or an oil bearing although the performance will degrade.

Furthermore, in the present embodiment, the Z stage driving part, that is, Z direction driving device 43 is configured by the coil 13 connected to the large air slide 89, and the Z stage driving-use magnetic circuit GMC for driving the large air slide 89 in the Z direction by flowing current to the coil 13. This is superior, but the present invention is not limited thereto, and ball screw feeding can be adopted.

In the present embodiment, the large air slide movable part 11 (Z direction movable part) of the large air slide 89 is supported by the constant load spring, but is not limited thereto, and the constant load spring is not necessary if the Z direction is in a lateral direction.

Any embodiments of the various embodiments described above may be appropriately combined and the respective advantages may be obtained.

The three-dimensional measurement probe according to the present invention can measure the measuring object with ultrahigh precision of 0.01 microns order from below and from the side of the measuring object, and thus the tilt eccentricity of an aspheric lens can be measured with ultrahigh precision by simultaneously measuring the front and back surfaces. The probe has an advantage of being less likely to break, having long lifespan, and being easily and frequently used in factory sites, thereby achieving higher precision of the aspheric lens that cannot be manufactured unless measurement is possible, and enhancement in production yield, and contributing to enhancement in performance of the product embedded with the aspheric lens such as a digital camera, a movie, and a portable telephone with a camera of smaller and higher image quality, and an optical disc of higher capacity, and reduction in cost. The probe is also widely applicable to research and development of medical equipment, gears of automobiles, nanotechnologies, and micro machines.

By properly combining the arbitrary embodiments of the aforementioned various embodiments, the effects possessed by the embodiments can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A three-dimensional measurement probe comprising:
   a cylindrical small slidably moving shaft part having one end arranged with a stylus for contacting a surface of a measuring object to be measured and another end arranged with a magnetic pin;
   a small air bearing part provided with a cylindrical hole that fits with the small slidably moving shaft part, and including an air outlet forming a compressed air film in a gap with the small slidably moving shaft part;
   a magnetic force generating part for generating magnetic force for preventing movement in a Z direction or axial direction of the cylindrical small slidably moving shaft part and a rotating direction about the Z direction by constructing a magnetic circuit with a magnet arranged at the end of the small air bearing part and a plurality of yokes in a non-contact manner with the pin;
   a displacement detecting part for detecting a displacement in the Z direction of the small slidably moving shaft part with respect to the small air bearing part;
   a Z stage for guiding the movement in the Z direction of the small air bearing part; and
   a Z stage driving device for driving the Z stage such that the displacement in the Z direction becomes substantially constant when moving one of the measuring object and the Z stage in XY directions orthogonal to the Z direction and orthogonal to each other and when moving the stylus in the Z direction along a shape of the measuring object.

2. The three-dimensional measurement probe according to claim 1, wherein at least one yoke of the plurality of yokes is a ring-shaped yoke.

3. The three-dimensional measurement probe according to claim 2, wherein a shape near a gap of the pin and the yoke has a constant thickness in the Z direction and forms a taper from a center-side to an end-side at both ends of the pin in a longitudinal direction of the pin.

4. The three-dimensional measurement probe according to claim 3, wherein the yoke is thicker than the pin in shapes near a gap of the pin and the yoke.

5. The three-dimensional measurement probe according to claim 1, wherein
   the displacement detecting part is configured by an optical probe displacement detecting part comprising at least a semiconductor laser integrally fixed with the small air bearing part, for emitting a laser beam; a mirror arranged in the small slidably moving shaft part, for being irradiated with the laser beam from the semiconductor laser and reflecting the laser beam; a lens for collecting the laser beam from the semiconductor laser on the mirror; and a light detector for receiving the reflected light from the mirror; and
   the laser beam from the semiconductor laser is irradiated on the mirror, the reflected light from the mirror is received by the light detector, and a displacement in the Z direction is detected from an output signal of the light detector.

6. The three-dimensional measurement probe according to claim 5, further comprising an oscillation frequency stabilizing laser for emitting an oscillation frequency stabilizing laser beam, and
 a Z coordinate measuring part for irradiating the oscillation frequency stabilizing laser beam emitted from the oscillation frequency stabilizing laser on the mirror of the displacement detecting part, and measuring a Z coordinate of the mirror from the reflected light reflected by the mirror.

7. The three-dimensional measurement probe according to claim 1, further comprising a non-magnetic stopper for stopping excessive movement of the small slidably moving shaft part when force exceeding the magnetic force that prevents the movement in the Z direction of the small slidably moving shaft part with respect to the small air bearing part and the rotating direction with the Z direction as an axis is applied in one of the Z direction of the small slidably moving shaft part and the rotating direction with the Z direction as an axis.

8. The three-dimensional measurement probe according to claim 1, wherein the Z stage is configured by an air bearing.

9. The three-dimensional measurement probe according to claim 1, wherein the Z stage driving device is configured by a coil connected to the Z stage and a magnetic circuit for driving the Z stage in the Z direction by flowing current to the coil.

10. The three-dimensional measurement probe according to claim 1, wherein a movable part of the Z stage is supported by a constant load spring including a thin plate wound in a spiral form to generate tensile force substantially equal to a weight of the movable part.

11. A three-dimensional measurement probe comprising:
 a cylindrical small slidably moving shaft part having one end arranged with a stylus for contacting a surface of a measuring object to be measured and another end arranged with a magnetic pin;
 a small air bearing part provided with a cylindrical hole that fits with the small slidably moving shaft part, and including an air outlet forming a compressed air film in a gap with the small slidably moving shaft part;
 a magnetic force generating part for generating magnetic force for preventing movement in a Z direction or axial direction of the cylindrical small slidably moving shaft part and a rotating direction about the Z direction by constructing a magnetic circuit with a magnet arranged at the end of the small air bearing part and a plurality of yokes in a non-contact manner with the pin, at least one yoke of the plurality of yokes being a ring-shaped yoke, a shape near a gap of the pin and the yoke having a constant thickness in the Z direction and forming a taper from a center-side to an end-side at both ends of the pin in a longitudinal direction of the pin, the yoke being thicker than the pin in shapes near a gap of the pin and the yoke;
 a displacement detecting part for detecting a displacement in the Z direction of the small slidably moving shaft part with respect to the small air bearing part, the displacement detecting part being configured by an optical probe displacement detecting part comprising at least a semiconductor laser integrally fixed with the small air bearing part, for emitting a laser beam, a mirror arranged in the small slidably moving shaft part, for being irradiated with the laser beam from the semiconductor laser and reflecting the laser beam, a lens for collecting the laser beam from the semiconductor laser on the mirror, and a light detector for receiving the reflected light from the mirror;
 a Z stage for guiding the movement in the Z direction of the small air bearing part, the Z stage being configured by an air bearing;
 a Z stage driving device for driving the Z stage such that the displacement in the Z direction becomes substantially constant when moving one of the measuring object and the Z stage in XY directions orthogonal to the Z direction and orthogonal to each other and when moving the stylus in the Z direction along a shape of the measuring object, the Z stage driving device being configured by a coil connected to the Z stage and a magnetic circuit for driving the Z stage in the Z direction by flowing current to the coil, a movable part of the Z stage being supported by a constant load spring including a thin plate wound in a spiral form to generate tensile force substantially equal to a weight of the movable part;
 an oscillation frequency stabilizing laser for emitting an oscillation frequency stabilizing laser beam;
 a Z coordinate measuring part for irradiating the oscillation frequency stabilizing laser beam emitted from the oscillation frequency stabilizing laser on the mirror of the displacement detecting part, and measuring a Z coordinate of the mirror from the reflected light reflected by the mirror; and
 a non-magnetic stopper for stopping excessive movement of the small slidably moving shaft part when force exceeding the magnetic force that prevents the movement in the Z direction of the small slidably moving shaft part with respect to the small air bearing part and the rotating direction with the Z direction as an axis is applied in one of the Z direction of the small slidably moving shaft part and the rotating direction with the Z direction as an axis,
wherein the laser beam from the semiconductor laser is irradiated on the mirror, the reflected light from the mirror is received by the light detector, and a displacement in the Z direction is detected from an output signal of the light detector.

* * * * *